(12) United States Patent
Huffa et al.

(10) Patent No.: US 11,713,525 B2
(45) Date of Patent: *Aug. 1, 2023

(54) METHODS FOR MANUFACTURING FOOTWEAR ARTICLES

(71) Applicant: Fabdesigns, Inc., Malibu, CA (US)

(72) Inventors: Bruce Huffa, Encino, CA (US); Concetta Maria Huffa, Encino, CA (US)

(73) Assignee: Fabdesigns, Inc., Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,409

(22) Filed: Nov. 29, 2021

(65) Prior Publication Data

US 2022/0154374 A1 May 19, 2022

Related U.S. Application Data

(62) Division of application No. 16/414,640, filed on May 16, 2019, now Pat. No. 11,186,930.
(Continued)

(51) Int. Cl.
*D04B 1/24* (2006.01)
*A43B 1/04* (2022.01)

(52) U.S. Cl.
CPC .............. *D04B 1/24* (2013.01); *A43B 1/04* (2013.01); *D10B 2501/043* (2013.01)

(58) Field of Classification Search
CPC ... D04B 1/22; D04B 1/24; D04B 1/26; D04B 1/265; D04B 7/04; D04B 7/30; A43B 1/04; D10B 2501/043
See application file for complete search history.

(56) References Cited

U.S. PATENT DOCUMENTS

| 1,712,344 A | 5/1929 | Graeber |
| 1,828,533 A | 10/1931 | Hoffmann |
| (Continued) | | |

FOREIGN PATENT DOCUMENTS

| DE | 3937406 | 5/1991 |
| DE | 4439907 | 5/1996 |
| (Continued) | | |

OTHER PUBLICATIONS

Gupta, B.S., and M. Afshari, "Tensile Failure of Polyacrylonitrile Fibers." Handbook of Tensile Properties of Textile and Technical Fibres, Woodhead Publishing, Mar. 27, 2014, www.sciencedirect.com/science/article/pii/B978184569387950014X?via%3Dihub. (Year: 2014).

*Primary Examiner* — Danny Worrell
(74) *Attorney, Agent, or Firm* — Garson & Gutierrez, PC

(57) ABSTRACT

Systems and methods for manufacturing knitted shoe uppers. An article of fully finished three-dimensionally weft knitted footwear is manufactured through a knitting process which can be performed by an automated V-bed flat knitting machine. During the knitting process, a plurality of knitted members are knitted into shape sequentially and connected to one another through knitted live hinges, each member being a ply, a layer, a layer portion or an appendage. The knitting machine manipulates the knitted members into their destined places as in the final product without cutting and sewing, thereby forming a seamless unitary textile construction. The process creates a seamless, full gauge, dimensionally stable footwear upper, as a unitary textile construction with an integrated anatomically appropriate heel. The entire upper, including the closure element of the upper, may be completed exclusively by the knitting machine, ready for the following shoe making process.

20 Claims, 31 Drawing Sheets

Related U.S. Application Data

(60) Provisional application No. 62/673,091, filed on May 17, 2018.

(56) References Cited

U.S. PATENT DOCUMENTS

| | | | |
|---|---|---|---|
| 2,294,916 | A | 9/1942 | Kretser |
| RE24,737 | E | 11/1959 | Bolles et al. |
| 3,733,856 | A | 5/1973 | Masahiro |
| 3,859,824 | A | 1/1975 | Krylov et al. |
| 3,992,903 | A | 11/1976 | Janda et al. |
| 4,122,555 | A | 10/1978 | Safrit et al. |
| 4,237,706 | A | 12/1980 | Patthey |
| 4,748,078 | A | 5/1988 | Doi et al. |
| 5,517,832 | A | 5/1996 | Kristensen |
| 5,615,562 | A | 4/1997 | Roell |
| 6,854,200 | B2 | 2/2005 | Hipp et al. |
| 6,986,269 | B2 | 1/2006 | Dua |
| 8,448,474 | B1 | 5/2013 | Tatler et al. |
| 8,973,410 | B1 | 3/2015 | Podhajny |
| 9,149,086 | B2 | 10/2015 | Greene et al. |
| 9,226,540 | B2 | 1/2016 | Podhajny |
| 9,549,591 | B2 | 1/2017 | Uchikawa et al. |
| 9,661,892 | B2 | 5/2017 | Meir |
| 9,771,673 | B2 | 9/2017 | Ikenaka et al. |
| 9,976,236 | B2 | 5/2018 | Terai et al. |
| 10,233,574 | B2 | 3/2019 | Wan et al. |
| 10,294,591 | B2 | 5/2019 | Podhajny et al. |
| 10,683,594 | B2 | 6/2020 | Li et al. |
| 10,753,019 | B2 | 8/2020 | Berrian et al. |
| 11,186,930 | B2 * | 11/2021 | Huffa .................. D04B 1/24 |
| 2014/0134378 | A1 | 5/2014 | Downs et al. |
| 2016/0029736 | A1 | 2/2016 | Meir |
| 2016/0075061 | A1 | 3/2016 | Waas et al. |
| 2016/0369436 | A1 | 12/2016 | Stewart et al. |
| 2017/0176146 | A1 | 6/2017 | Bohringer et al. |
| 2018/0002133 | A1 | 1/2018 | Stewart et al. |
| 2018/0055145 | A1 | 3/2018 | Aristizabal et al. |
| 2018/0184755 | A1 | 7/2018 | Yumiba et al. |
| 2018/0303204 | A1 | 10/2018 | Woodard |
| 2018/0343956 | A1 | 12/2018 | Li et al. |
| 2018/0343973 | A1 | 12/2018 | Hancock |
| 2019/0153639 | A1 | 5/2019 | Nishigaki |
| 2019/0203389 | A1 | 7/2019 | Liu |
| 2019/0231021 | A1 | 8/2019 | Hoying et al. |
| 2019/0233988 | A1 | 8/2019 | Harada et al. |
| 2019/0328075 | A1 | 10/2019 | Poulsen et al. |

FOREIGN PATENT DOCUMENTS

| | | |
|---|---|---|
| EP | 0061975 | 10/1982 |
| EP | 0526406 | 2/1993 |
| EP | 1298239 | 2/2003 |
| EP | 2960362 | 12/2013 |
| EP | 3011855 | 4/2016 |
| EP | 3412814 | 12/2018 |
| EP | 3564422 | 11/2019 |
| EP | 3569750 | 11/2019 |
| FR | 598096 | 4/1925 |
| FR | 2149520 | 8/1972 |
| GB | 720687 | 12/1954 |
| GB | 2214939 | 9/1989 |
| TW | M547866 U | 1/2017 |
| WO | WO2010142608 | 12/2010 |
| WO | WO2011043998 | 4/2011 |
| WO | WO2015134648 | 9/2015 |
| WO | WO2016144971 | 9/2016 |

* cited by examiner

METHODS FOR MANUFACTURING FOOTWEAR ARTICLES

PRIORITY

This application is a divisional of, and claims the benefit of priority to, U.S. patent application Ser. No. 16/414,640 filed May 16, 2019, entitled "SYSTEM AND METHOD FOR KNITTING SHOE UPPERS", now U.S. Pat. No. 11,186,930 issued on Nov. 30, 2021, which claims the benefit of priority to U.S. Provisional Patent Application Ser. No. 62/673,091 filed May 17, 2018 and entitled "METHOD FOR KNITTING A SHOE UPPER", the contents of each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Technological Field

Embodiments of the present disclosure relate generally to footwear manufacturing, and more specifically, to the field of knitting mechanisms for manufacturing footwear uppers.

2. Description of Related Technology

Conventional methods of manufacturing footwear uppers require the uppers be manufactured with multiple separate components, requiring multiple individual sub-assemblies and seams. From the perspective of manufacturing, utilizing multiple materials, which have different properties and performance features, then laminating, cutting, sewing, and constructing those multiple materials into an article of footwear, can be a wasteful, labor intensive, and inefficient practice. For example, the various materials utilized in a conventional upper may be obtained in different widths, lengths, thicknesses, densities, and packaging arrangements. The materials may be from a single supplier or many suppliers all over the world. Accordingly, a manufacturing facility must coordinate, inspect, inventory, and stock specific quantities of readymade roll good materials ("yardage"), with each material being a static design created by suppliers that may have distinct seasonal and trend perishability.

Most laminated roll good materials are homogenous knitted material types that are laminated with additional layers, adhesives, foams, films and other materials in specialized equipment that runs at dozens of yarns per minute. Piece good laminations have multiple structures applied to reinforce, cushion, and stabilize the base knitted body of the upper, and require that each piece be laid up (placed) into a registration template or mold. The various roll good component materials may also require additional machinery to prepare, inspect, or they may require sub-assembly line techniques to cut or otherwise prepare the material for incorporation into the footwear. In addition, incorporating separate materials into an upper may involve a plurality of distinct sub-assembly manufacturing steps requiring significant labor, space, and resources. Each time a material is handled, there is a waste factor associated with each process, potential for mismatching lengths and widths, risk of damage to the material, potential for incompatibility of materials, risk of components placed out of registration, restocking of end lots, and other challenges to managing multiple materials in a supply chain and manufacturing process.

In current knitted footwear upper manufacturing, there are several ways to manufacture knitted uppers, including: cutting and sewing two-dimensionally shaped textile roll goods, shaping, trimming, and assembling two-dimensionally knitted textile uppers, and manufacturing short-row shaped three dimensionally knitted textiles, all of which are considered semi-finished textiles that require subsequent processes of sub-assemblies, multiple steps of alignment, applying various structures and materials, applying additional gluing or adhesive, and additional fabric components on the upper to apply added layers of functional materials. These subsequent processes result in added weight of the upper, seams on multiple places on the upper that create stiffness, registration dilemmas, reduced breathability, and sewing defects. Seams from multiple applications create pressure points on the foot, resulting in blisters and other irritations. In the case of applying foams, additional materials, additional polymer layers, additional structural layers, and irritation is worse at the seam points.

In the shoe manufacturing process, it is generally desirable to minimize the number and types of materials in the article of footwear, particularly athletic footwear. Fewer materials reduces costs and increases efficiency, given that shoe manufacturing is a labor-intensive process. The typical shoe manufacturing process encompasses the steps of selecting the materials required to combine to make a shoe upper to attach to a sole. Sending large rolls of the selected material to be flame laminated, adhesive laminated, bonded, or otherwise glued together. Waste occurs at several points in the lamination process: as the machinery gets started, is adjusted, and finishes the process. Those roll goods are then taken and laid out in multiple plies on cutting tables or single plies are die cut to shape. An unavoidable amount of waste occurs in the cutting process. The next step is reducing the thickness of the joining edges ("skiving") for leather or synthetic leather, reducing the thickness of the upper pieces ("splitting"), laminating by adhesive or gluing the interlining to the upper pieces ("interlining"), forming the eyelets, installing grommets for the eyelets if required by the design, adding reinforcement components, adding cushion foam components, stitching the upper pieces together, shaping the upper over a last ("lasting"), sewing the edges of the upper, stitching ("Strobeling") the upper to a liner ("insole lining"), front part molding of the upper on the last, back part molding of the upper on the last, molding or sewing the bottom of the shoes to the upper ("bottoming"), setting the materials and adhesives in a heat tunnel.

Modern footwear designs, principally athletic shoe designs, require numerous upper pieces and complicated manufacturing steps, leading to high labor costs, lengthy time frames for sourcing materials, fabric compatibility issues, seam compatibility issues, production waste in the cutting process. Combining separate materials into a cut and sew type upper involves multiple distinct manufacturing stages that require multiple labor actions and activities. Employing a plurality of materials and seams, in addition to a plurality of textiles, may also make the footwear heavier, less comfortable, less anatomically functional.

The term "V-bed knitting" or "weft knitting" is used to describe the construction of fabric by feeding yarn and forming loops in the horizontal ("weft") direction. FIG. 1 illustrates the stitches created in a weft knitting process. FIG. 2 shows a side view of the arrangement of two needle beds on a weft knitting machine. FIG. 3 shows side view of the arrangement of four needle beds on a weft knitting machine. FIG. 4 shows a side view of the weft knitting machine with four needle beds and also shows produced fabric exiting the machine.

To create the fabric, the machine 4 draws strands of yarn 3 into needles 5, and uses the needles to interloop the strands. AV-bed weft knitting machine typically has at least two opposing needle beds 6 as shown in FIG. 2, which are positioned at an angle resembling a VFIG. Each bed 6 has a set of needles 5. In the case of 4 needle bed machines as shown in FIG. 3, it is equipped with additional two auxiliary or alternate beds 8 which have fashioning points 7 or additional needles that allow relocating stitches from the V-beds 6 to another location or adding additional stitches.

As shown in FIG. 4, in weft knitting on a V-bed knitting machine, loops are progressively built up in a fabric by converting the new yarn strands 3 being fed into the needle, creating into new rows of loops ("courses"), each stitch being a wale. Yarn 3 is fed into the machine by automatically pulling a plurality of strands of yarns or other materials off a plurality of cones 9, or packages with the movement of the knitting machine feeders 10 introducing yarn into the needles 5. Several feeders 10 are located on each machine and run along rails 11 in a horizontal direction. FIG. 5 shows the configuration of an autarkic feeder. The feeders 10 of some V-bed knitting machinery, such as the Stoll CMS ADF V-bed knitting machine, have standard OEM direct yarn feed to standard "autarkic" (independent and individually controlled) motorized feeders. They are capable of standard multiple OEM functions, knitting, floating, inlaying, intarsia, plaiting, and tucking in the same machine pass.

FIG. 6 shows the configuration of a V-bed knitting machine. Other more common weft knitting machines (such as the Stoll CMS 530 HP V-Bed knitting machine) have strands pulled from cones 9, through one or more yarn guides 17, into standard OEM stop motions 13, on an OEM bar 16 then to side positive feed devices 14, into side tensioning devices 15, along the yarn feeder rails 11, into yarn feeders 10, and into needles 5, activated by the cam box 12 which rides along the needle bed 6. The strands 3 run through the feeders 10 and are manipulated by both the feeders 10 along the length of a pre-programmed length of the needle bed 6 also in the horizontal (weft) direction, while the cam box 12 travels the length of the needle beds 6 activating the knitting needles 5 to act in interlacing of the strands 3 into loops of fabric 4.

The resulting fabric 4 exits the machine under the needle beds. An electronic weft V-bed knitting machine can be programmed automatically to select the needles and other elements via mechanical and/or digital instruction process. In forming loops (as shown in FIG. 1), the strands bend around the knitting needles 5 and form a small dynamic arch, which can be broken down into its parts. FIG. 7 shows parts of a knitting loop. The head 18 is usually visible in the technical face 1 of a fabric. The feet 19 are usually visible on the technical back 2, or purl side of a fabric. The legs 20 stabilize the head 18 and feet 19, suspended in the fabric, and linked to other adjacent loops. The legs 20 also stabilize any materials which are inlaid 21 into the fabric.

There are traditionally two types of inlay in traditional weft knitted V-bed fabrics, single jersey 22 inlay, where loops from a single bed fabric are transferred temporarily to the rear bed, one or more strands travel together 21, passing between loops on the front and rear beds in one or more traverses of the knitting machine. After the desired amount of materials are inserted (inlaid), the loops that were temporarily transferred to the rear bed, and then deposited back into the front bed in their original position, or in another desired position. In double bed fabric 23, the inlayed strand (s) 21 pass between an arrangement of loops on both the front bed 24 and the rear bed 25. After the desired amount of inlaid materials 21 are inserted (inlaid), another row (course) of loops is added in a desired knitting structure.

Modern V-bed flat knitting machines since 1987 move only where needed to digitally select and knit, or where required to move yarn feeders in the fabric for plaiting, intarsia, striping, jacquard, fully fashioning, flesage (wedge-knitting), short-rowing, inlay, and other techniques.

In the traditional manner of shaping of V-bed weft knitted fabric into an upper, there are three main ways currently utilized: cut and sew, fully fashioned, and whole garment technique. FIG. 8 shows cut and sew roll goods for making shoe uppers. Cut and sew is exactly that, cutting fabric, usually cutting pieces from one or several roll goods or fabric constructions, and sewing the cut pieces of each together to fashion an upper. The sub-assembled textile components are made into finished uppers by combining the knitting process and additional finishing processes such as: knitting two-dimensional rectangular textiles, knitted as plain fabric or with a shoe motif, then die cutting to the respective footwear shape, finishing raw edges, and sewing into a complete upper with a seam closing up the heel, toe flex, or medial arch. Cutting creates scrap, and requires readying cut pieces for the production process (sub-assembly), including sorting, retarding fraying, coordinating timing, lot matching, and bundling. The cut and sew method, generates a significant amount of scrap waste, is labor intensive, and the stitching results in bulky seams. Sewing seams are subject to human error and fatigue in the sewing process. The more seams, the more risk of damage and waste in the process. In weft-knitting, there are various ways to reduce seams, which have been applied to knitting footwear uppers into one piece, rather than the typical leather-industry based process of assembling three to five components into an upper.

FIG. 9 shows the semi-finished textile upper made in a fully fashioned method. Fully-fashioned is knitting semi-finished panels to shape in two or three-dimensions using short rowing, and then assembling the shaped pieces in a post process. This knitting process uses short rowing 29 (wedge knitting) to shape the stitches into the upper and only knits loops where required. The cam box 12, needle selection and the feeders 10 follow the shape of the product's knitting structure. The result is a single layer semi-finished two-dimensional upper shape, which requires one or more seams to finish the fabric into an upper to attach to a sole.

A hybrid manufacturing method of cut and sew and fully-fashioning is knitting a two-dimensionally U-shaped fabric format, optionally die cutting the tongue area, depending upon the instep design, finishing raw edges, and sewing the two-dimensional fabric into a complete upper with one or more seams closing up the heel, toe flex, or medial arch. FIG. 10 shows a U-shaped die cut shoe upper made in a hybrid manufacturing method.

Another hybrid employed in upper manufacturing is knitting a two-dimensional upper to shape in a butterfly format, and then sewing one or more seams to close up the heel, toe flex, or medial arch in one or more post processes. FIG. 11 shows a short row butterfly upper semi-finished textile upper. Another variation of this "butterfly" layout is shaping the toe and/or heel areas in addition to the short rowing to shape the sides. This variation is knitting portions of the "butterfly" layout in three-dimensions and then sewing one or more seams to close up the heel, toe flex, or medial arch in one or more post processes.

Shaping courses in two-dimensional textile knit structures and in the fully-fashioned "butterfly" layout and hybrid versions of knitting uppers described above is achieved by using short-rowing techniques. FIG. 12 demonstrates a loop diagram of short rowing, which is adding or decreasing needles by knitting closed darts that resemble wedges in the finished fabric. Fully fashioning an upper to shape saves considerable material, (upwards of sixty percent) which would otherwise be cut away in a cut and sew process, and discarded as post production waste. In fashioning an upper on a two-needle bed flat knitting machine, the typical aforementioned wedge knitting (short rowing structure 26) technique is used to turn the heel grain 27, for example, in relation to the grain 28 of the main body of the upper.

However, the fabric shaping on two-needle bed machines by using short row (wedge) knitting 26 has limitations of increasing or decreasing by one-needle wide, by one-needle high at a time, creating an acute angle, which is subject to variations in materials. Short rowing cannot make a right angle. Increasing or decreasing by more than one-needle wide by one-needle high creates stress on the knitting strand and the knitting needles in pulling a long loop 29 which spans a space two or more times longer and wider, than the original loop. The result is a potential failure in knitting and/or a high stress fault line in the fabric that may not endure abrasion, tensile stretch and recovery, or the shoe making process. Opacity may also be an issue with stretching loops farther than one stitch width at a time. Utilizing this short rowing (wedge knitting closed darts) technique creates a semi-finished upper (as shown in FIG. 11), which requires a seam to join the sides at the heel, medial arch or one or more places on the foot, to complete the upper's final shape.

FIG. 13 shows seamless whole garment short row. Seamless double-bed knitted uppers are currently created by knitting these afore mentioned short row technique (as shown in FIG. 13). Shaping typically starts at the heel, which limits the angle of the heel 27 to between thirty-five and seventy degrees to the main body of the upper 28, much less than an anatomically correct angle of a human heel. FIG. 4 shows an anatomy of a human foot.

Depending upon the material qualities, the angle of the heel, instep, toe and other shaped areas of current double bed uppers knitted in this manner are limited by mechanical transferring constraints of two-bed flat-knitting machinery, and also the inability of the structure of double bed fabrics in general to withstand the stretching required of racking of the needle bed 6 to shift the legs 20 of tightly interlaced loops without breaking the strands. Utilizing this wedge knitting technique (short rowing) in FIG. 13, there is no transferring of double-bed fabric loops, only adding of new rows of loops in a wedge like shape (short rowing). In FIG. 12, which is a standard and historically used weft-knitting technique, there is no transferring of loops. Rather, loops are held 29 while the wedge of loops is progressively knitted. Short rowing distorts the fabric grain on an angle. The accuracy of repeating the angle in production is subject to many variations including: material qualities, dye content of yarns, elasticity of yarn, size of yarn strand, tightness of the stitches, calibration of the machine, and other factors affecting material and machine consistency. Increasing or decreasing the degree of the short row angle is limited by one-needle in the X direction by one-needle in the Y direction, as described above. Moving more than this stretches loops and creates potential failure points as also described.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

Figure 1:
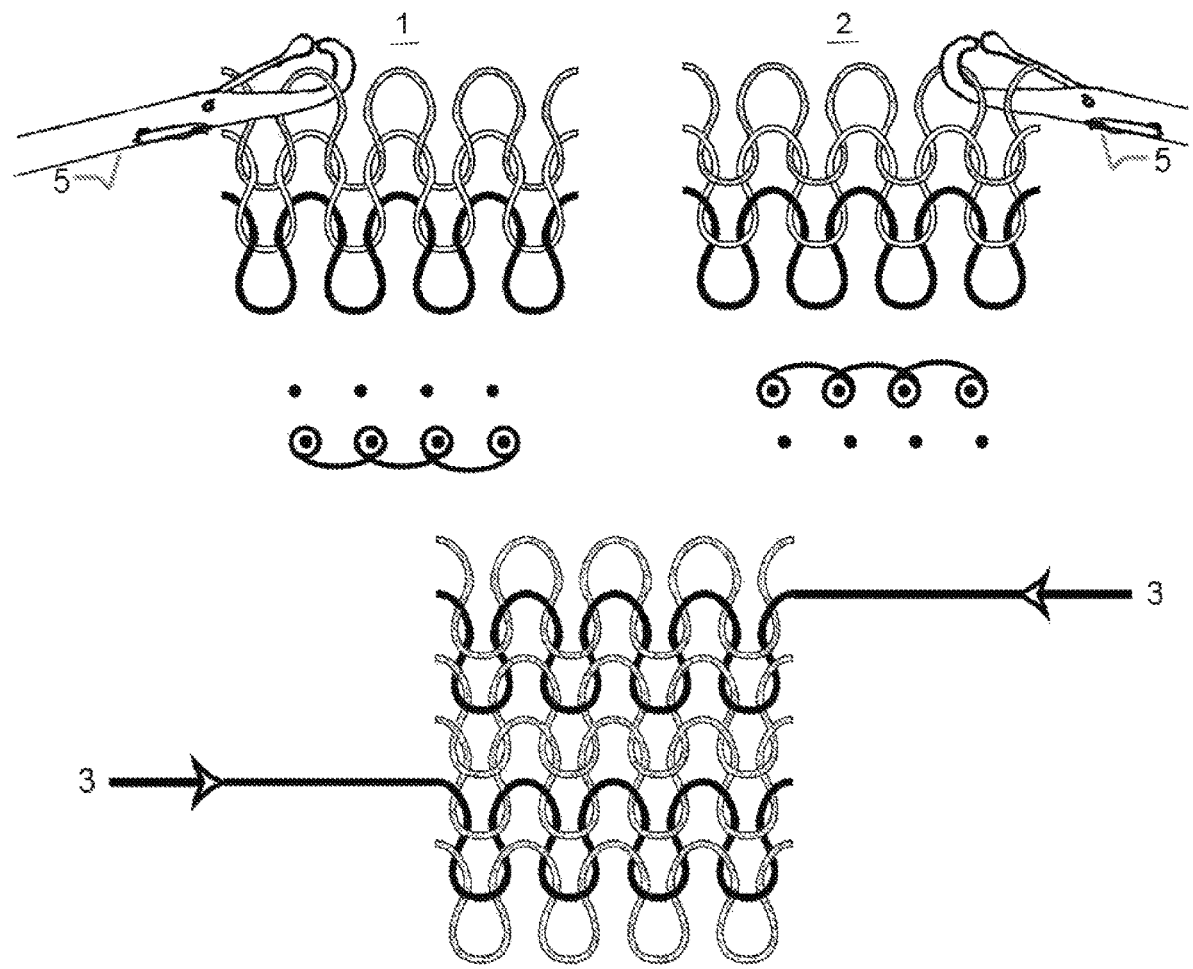
FIG. 1 illustrates the stitches created in a weft knitting process.
Figure 2:
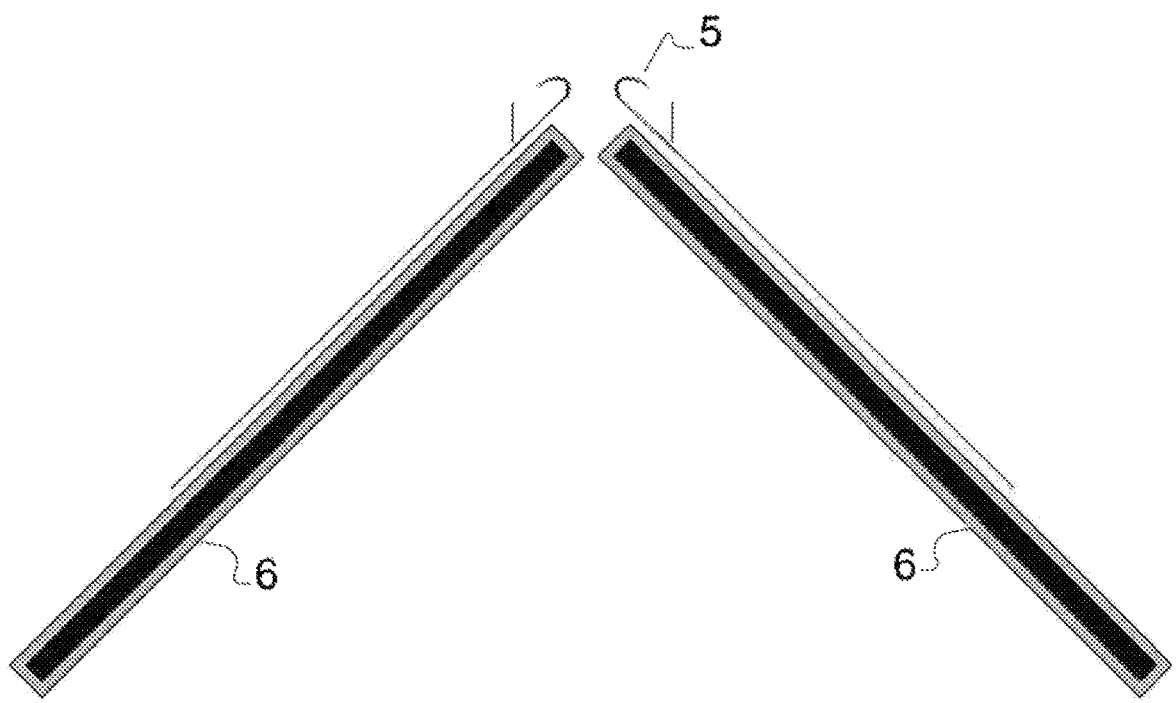
FIG. 2 shows a side view of the arrangement of two needle beds on a weft knitting machine.
Figure 3:
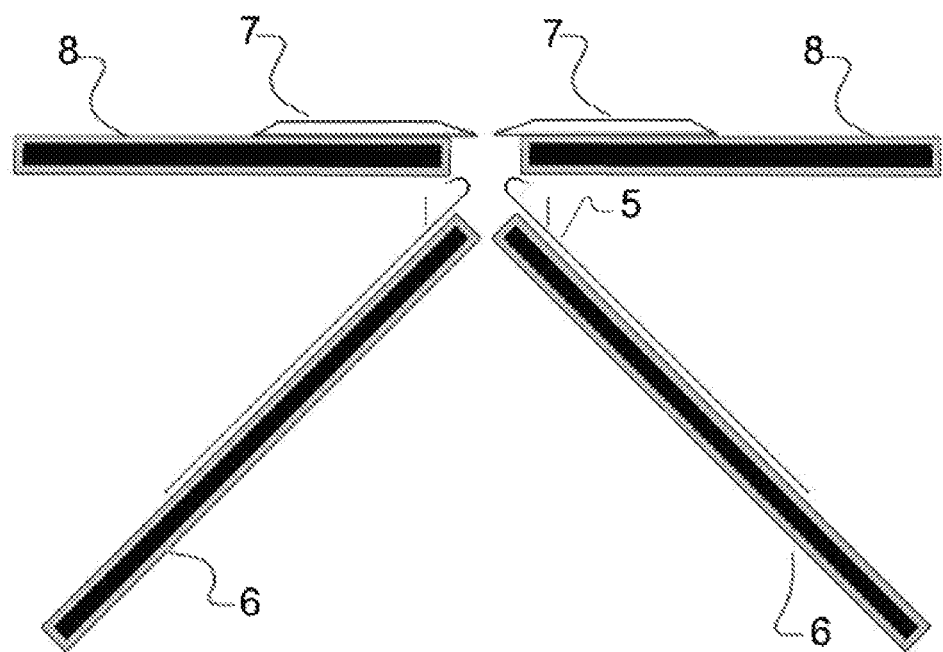
FIG. 3 shows side view of the arrangement of four needle beds on a weft knitting machine.
Figure 4:
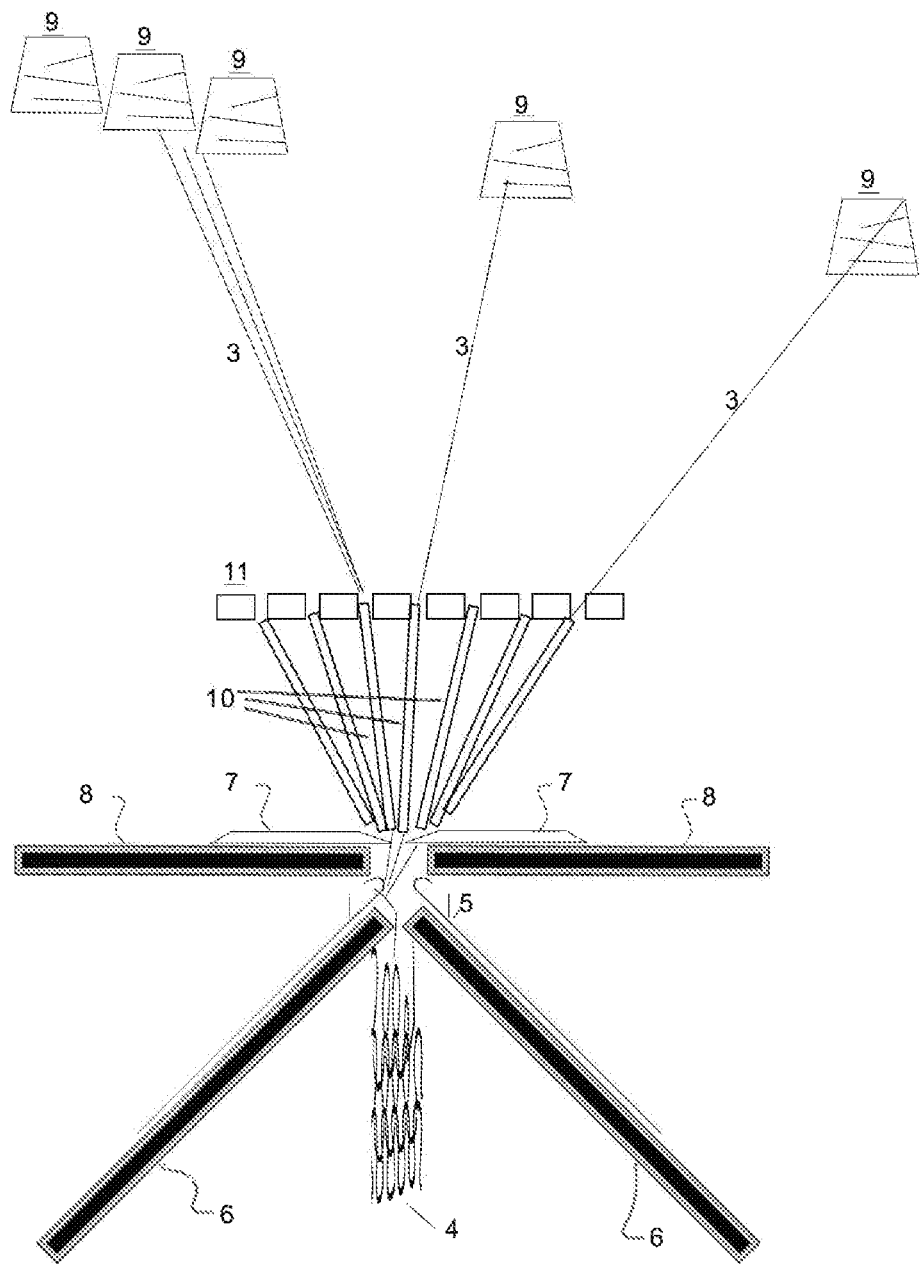
FIG. 4 shows a side view of the weft knitting machine with four needle beds and produced fabric exiting the machine.
Figure 5:
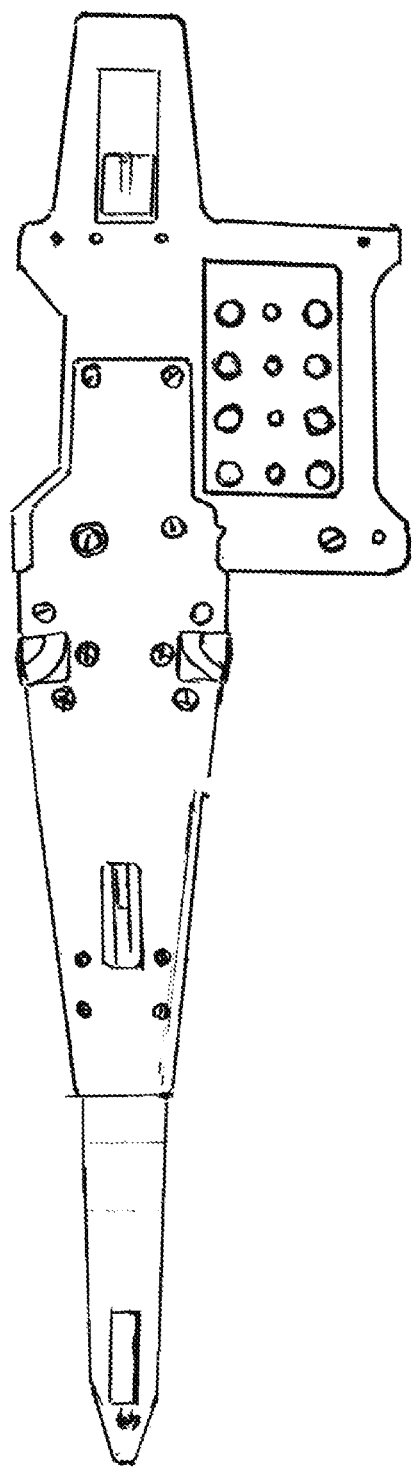
FIG. 5 shows the configuration of an autarkic feeder.
Figure 6:
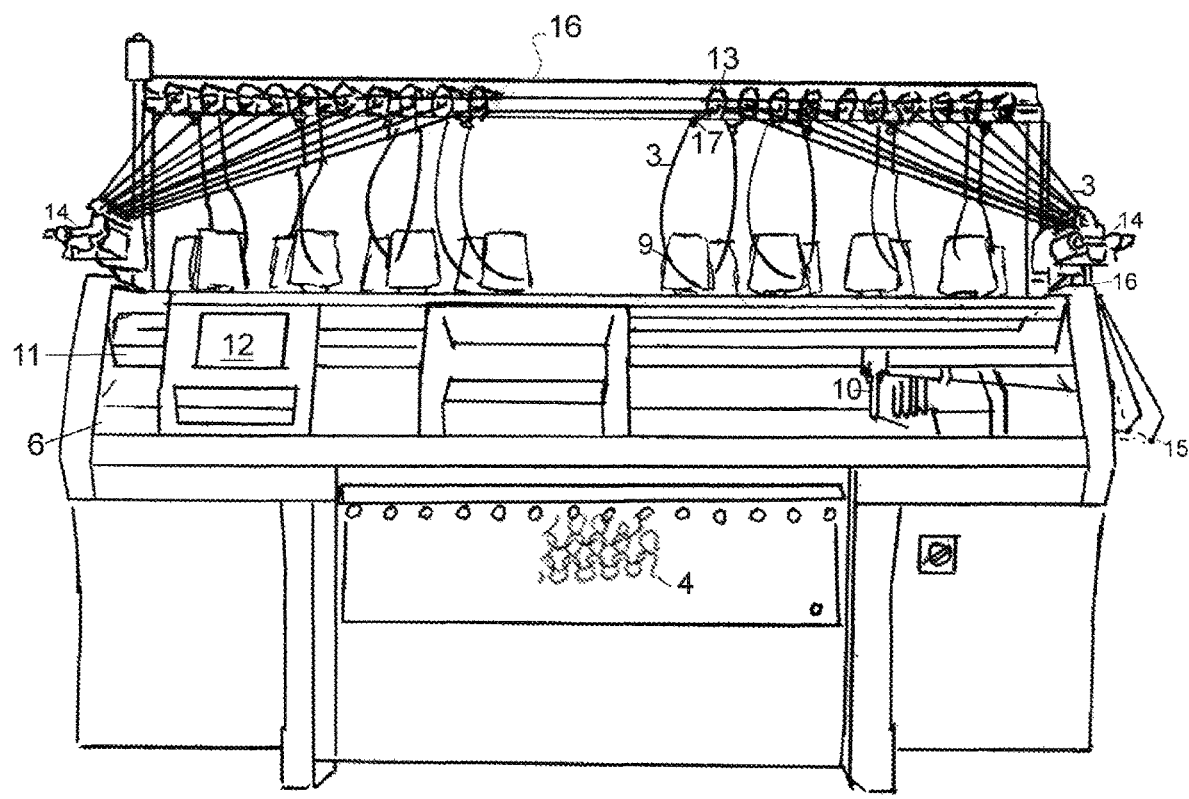
FIG. 6 shows the configuration of a V-bed knitting machine.

All Figures disclosed herein are © Copyright 2018-2019 Fabdesigns Inc. All rights reserved.

SUMMARY

Embodiments of the present disclosure provide a mechanism of manufacturing V-bed ("weft") knitted shoe uppers composed of multiple components on a knitting machine. The knitted shoe uppers are composed of multiple components which are knitted in sequential constructions and attached in the same knitting process, then gathered, plied, or folded together to create an upper. The sequentially knitted components require no cutting sorting or bundling of sub-components with each component having nearly zero waste.

Embodiments of the present disclosure provide a method of manufacturing a weft knitted article of footwear in a unitary construction on a V-bed flat knitting machine. The unitary construction is made of one or more yarn materials, which are incorporated into one or more stitch structures. Each stitch structure has a unique set of mechanical properties derived from the properties of the materials chosen, the tension exerted by various knitting machine parts on the material, and/or how the materials interlace and interloop with each other.

There may be one or more stitch structures forming a layer or layer portion. Two or more layers or layer portions may be combined to form an article of footwear with predefined functions and performance. The properties of each layer and the manner in which layers are combined affect the performance and comfort of the article of footwear. Each portion or layer may be a unitary construction completely formed and constructed by the machinery. Each portion and/or layer may be completely manipulated into attachment to the other layers entirely by the machine, and each portion and/or layer may be configured by the knitting machine in the same knitting process.

The knitted upper may include multiple knitted structured component layers and/or appendages. Each layer and/or appendage may have different features and benefits. When the layers and/or appendages are plied, and/or folded, and/or gathered together, a complete upper can be created. The knitted layer and/or layer portions and/or appendage structured components may be of the same or different knitted constructions and geometric configurations, each having a technical face side and a technical reverse side that can have different knit configurations. The knitted layer and/or layer portions and/or appendage structured components can also incorporate portions of a single layer construction and portions of a double layer construction. Double layer configurations may form pockets, channels, welt tunnels, gores, voids, ventilation holes, and other structural and functional knitted constructions may be integrated in one or more areas of the knitted component layer and/or layer portions and/or appendage structures. Inserts, hardware, foam, wiring, fiber optics, printed circuit boards, computing chips, heating elements and other materials may be placed into the pockets, channels, welt tunnels, gores, voids, and other structural and functional knitted constructions to provide support, stability, cooling heating, e-textile and/or smart performance characteristics and/or other desired properties to the knitted component layers and/or layer portions and/or appendage structures of the upper.

Embodiments of the invention allows for the creation of two and or three dimensionally knitted footwear upper to be formed, utilizing lightweight plies of multiple layer and/or layer portions and/or appendage structures, functional materials, and functional structures which are all completed in the knitting machine in an automated process, and with no need for human intervention, and ready for the shoe making process.

DETAILED DESCRIPTION

Exemplary Embodiments

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Embodiments of the present disclosure provide weft or V-bed knitting mechanism to create a two-dimensional or three-dimensional article of footwear. An exemplary integrated knitting process includes knitting, gathering, plying and/or folding two or more shaped layers or portions of layers to create a footwear upper. In varying shapes and configurations of each layer, layer portion and/or component, various materials and structures may be placed where desired as in the final product in three dimensions.

Certain materials may be placed on the interior of the void designed for holding a foot, other materials may be placed on the exterior of the assembly, and further materials may be "sandwiched" inside an upper, being neither on the outside nor inside the void holding the foot. Each layer or layer portion may be a knitted unitary construction that is completely formed, shaped, and configured by the machinery in the same knitting process. Entirely by using the V-bed weft knitting machine, a layer or layer portion may be manipulated into it predefined place as in the final product by the knitting machine and attached to one or more edges of the other layers and/or layer portions.

Embodiments of the present disclosure can advantageously create a fully shaped upper in a unitary textile construction, which is shaped entirely by the knitting machine, and ready for the following shoe manufacturing process, with minimal waste. Each layer or layer portion can be built and shaped exclusively in the knitting process by shaping single and/or double-knit structures. Each layer or layer portion may also incorporate appendage structures of support, function, and/or aesthetic applications that are also knitted in the same knitting process, eliminating the need for external sub-assemblies, management of extra processes, materials, and scrap.

An exemplary integrated knitting process advantageously and substantially reduces the number of manufacturing steps in building and reinforcing a knitted textile formation suitable for performing as a footwear upper in a unitary construction. The integrated knitting process advantageously and substantially reduces wasted materials and labor from lamination, cutting, pre-assembling, sewing, and finishing processes. The integrated knitting process advantageously and substantially reduces the number of manufacturing steps required in preparing a footwear upper structure from a two-dimensional knitted textile panel. The integrated knitting process minimizes the number of manufacturing steps in assembling a three-dimensionally knitted textile upper construction, which would otherwise require one or more sub-assemblies and multiple seam on various positions on the foot. The integrated knitting process further advantageously and substantially reduces the materials handling equipment and floor space required to receive and process laminated panels and additional roll goods.

In this manufacturing process, only raw material spools may need to be stocked and subsequently processed by the knitting machine. The resulting multi-layered footwear upper component configuration has multiple performance features integrated and with completely finished edges to enter the shoe finishing process as a unitary construction. Utilizing several lightweight layers interfacing with each other can add strength, performance or functional characteristics where required, contribute aesthetic novel features, and enable incorporation of embedded hardware or electronic inserts. It also leads to fewer seams and lightweight characteristics of the footwear. The designs, colors, textures, jacquards, performance characteristics, and any combinations of options may be different on each layer, and may be changed at will by adjusting, modifying, or creating a new knitting program.

Embodiments of the present disclosure can offer several functional advantages. First, a plurality of performance features (structures) can be implemented simultaneously in the integrated knitting process in the same unitary construction, with the structures attached by the knitting machine and aligned where needed. Second, various materials are allowed to be implemented consistently into the same upper layer, layer portion or in different portions of the resulting three-dimensional multi-layered textile upper construction. Third, each layer is allowed to have a specific performance focus, without being restricted by knitting techniques or materials of other layers or layer portions. A fourth advantage is that many materials that would otherwise require additional sub-assembly can be integrated. A few examples are padded areas, reinforcement structures, tongue assembly, insole, sole, and others. Fifth, the device allows for integration of fiber reinforcing materials, conductive materials, auxetic materials and numerous combinations of materials in layers that may be invisible, or otherwise concealed, to the user. Sixth, layers can be made as sub-assembly components as in the case of embedded wiring, fiber optics, silicon, ligament structures, pockets, tunnels, channels, or another three-dimensional textile configurations.

The manufacturing advantages of constructing layers and/or portions of layers and/or inserts configured by the knitting machine as a unitary construction, with each layer, or layer portion, and/or insert attached during the knitting process, can be: more efficient to manufacture by forming, attaching and configuring each portion with alignment to the whole; all portions having compatibility of being knitted on the same machine; and each portion knitted to accommodate other layer portions or structures on layers, or layer portions. More particularly, manufacturing efficiency may be increased by forming more knitted components during the knitting process and eliminating various steps (e.g., making a separate tongue structure, separate cushioning, separate reinforcement areas) or other layer pieces, which that are often cut, bundled, sorted, and attached in one or more manual processes. Structures, such as a tongue and other coordinating layers or portions of layered knit element may also have materials and/or structures in common, which react similarly when formed from the same strands. Likewise, layered elements may be created with similar or coordinating knit structures and compatible stitch densities so that they can accommodate each other. For example, utilizing the same yarn in two layers of a bi-component tongue area with padding and of a similar construction is a two-layer knit element in an ankle structure, imparts similar feel, strength, tactile, stretch, wear, thermal, as well as visual aesthetic look (color and texture matching).

The layers, layer portions, components, and/or plies may include a variety of yarn types, for example: reinforcing materials, cushioning component strands, aesthetic components, reflective, conductive, and electronic and fiber optic cables. These knitted configurations may include linings, reinforcement structures, and other constructed material layers, created entirely in the knitting process.

In the illustrated embodiment, a layer or layer portion of a shoe upper is created in a seamless unitary construction where the angle of the heel grain 27 is created in an anatomically appropriate angle relative to the main body grain 28 of an upper or portion of an upper. The anatomically appropriate angle provides enhanced comfort fitting of the foot.

The anatomically appropriate angle may result exclusively from a knitting process by utilizing four-needle-bed technology to join a heel insert to the main body fabric of a double-knitted upper layer in steep, right, and obtuse angles, thereby creating a truly seamless upper 30 or portion of an upper. The heel is knitted in the same knitting process, manipulated into place by the knitting machine, and attached to a main body medial and lateral side, or at least one edge of another portion of the unitary construction.

Figure 16:
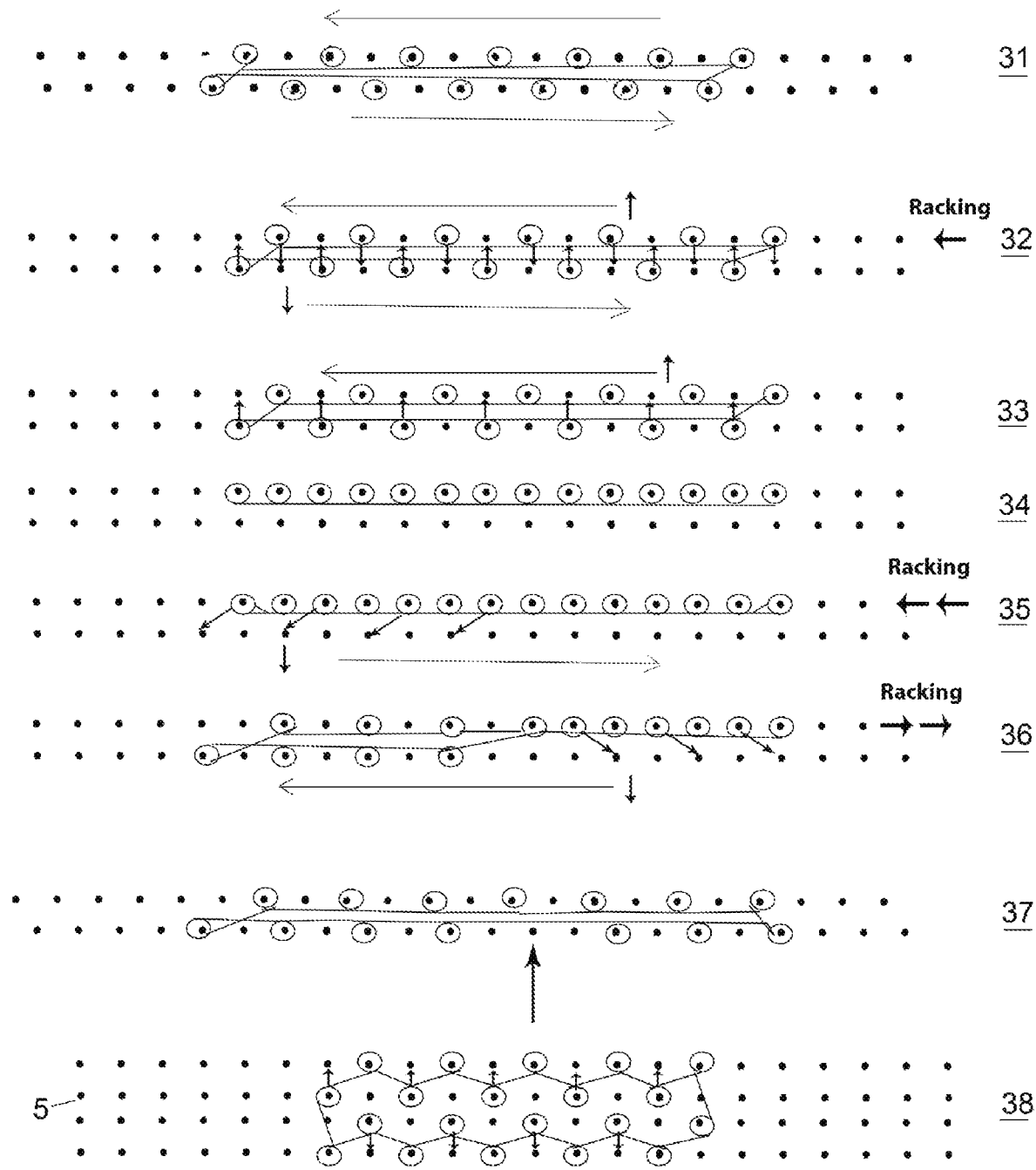
FIG. 16 illustrates the formation of a half-gauge tube sock upper in a knitting process.

FIG. 16 illustrates the formation of a half-gauge tube sock upper in a knitting process. Sock-like seamless tube structures created on modern V-bed flat knitting machinery are typically made utilizing two needle beds, and employ a half-gauge knitting technique 31, which is knitting alternating needles on opposing needle beds, in order to manipulate loops back and forth to empty needles of the opposing bed 32. In half-gauge knitting, each needle with a loop in one bed has an empty receiving needle in the opposing bed to which loops may be moved.

The half gauge loop manipulation 33 (transfer of loops) requires the machine to rack one-needle bed to align opposing needles for transfer. All stitches then reside on a single needle bed 34. To widen the tube, one-needle bed then racks one or more needle positions, and transfers half of the stitches (which previously resided on the opposing bed) on the opposing needle bed. These half of the stitches are also on one side of the tube 35 to their new positions. The machine then repeats the transferring of the remaining half of the stitches, which previously resided on the opposing bed, racking in the opposite direction 36, placing them in their new position on the opposing needle bed. This manipulation of stitches creates the shaping, narrowing or widening 37 of the upper, with small fashion marks, where the narrowing occurs due to placing two loops in the same hook, and small holes, where the widening occurs 37. The open spaces creating in widening 37 are then knitted in the next row of knitting. The resulting fabrication is two facing half-gauge jersey fabrics 31, each a single bed fabric, having similar structure of a sock with an interior purl face and an exterior knit face. This type of widening and narrowing technique is also used for knitting sock-like seamless tubular structures on V-bed flat knitting machinery with four needle beds 38. All two-needle-bed and four-needle-bed sock-like seamless tube structures currently manufactured on flat knitting machines result in half-gauge fabric, which is fifty-percent less dense than knitting all adjacent needles in a bed, due to taking every other needle out of action (half-gauge).

Whole garment technology is a weft knitting technique employed by flat V-bed machine builders such as Shima Seiki of Japan (trademark Whole Garment) and H. Stoll AG & Co. KG of Germany (trademark Knit and Wear). Whole garment technology utilizes half-gauge knitting techniques in making these sock-like tube constructions 31, shaping the tubes to make footwear, and typically joining the shaped tubes into garments and other products. Half-gauge is used for these techniques due to the transfer limitations of knitting and manipulating loops between two sets of opposing needles in a V-bed knitting machine, and having limited destinations to transfer stitches. Half-gauge is also used due to the mechanical transfer limitations of knitting and manipulating loops between two sets of opposing needles in a four-needle bed V-bed knitting machine, such as the Shima Seiki Mach2X and the H. Stoll AG & Co. KG 730T knitting machine, both having limited destinations to transfer stitches. In both sets of machinery, any loops which are transferred to the upper auxiliary beds must be transferred to the respective receiving bed (s), immediately in the next pass of the machine, and in the same direction that the machine knitting systems are moving. Current V-bed flat-knitted sock uppers, which utilize at least two needle beds, are created in half-gauge, using exclusively jersey-based (single bed) stitch structures such as jersey tuck, jersey knit, reverse jersey (purl), tubular jersey, and other sock structures similar to those made on circular weft-knitting machines (sock machines).

To create a three-dimensional sock-like footwear upper on a flat knitting machine, the flat-knitting machine utilizes loops on opposing needle beds (e.g., loop structures on the front beds 24), each creating a knit face and purl side fabric facing each other in a flattened tube structure. Alternating stitches on opposing needle beds are used for the purpose of transferring loops to the opposing open needles (e.g., loop structures on the rear bed 25) to create the desired shape.

To create the heel, the flat-knitting machine knits short rows of jersey in one portion of the tube to create the heel structure. The resulting tube sock-like upper structure is composed of one or more jersey-based knitting structures. Jersey based structures collapse on themselves, and edges roll toward the purl side. Jersey structure by itself is rarely suitable to attach to a sole and contain a foot in motion. A jersey typically requires post processes, and/or additional reinforcing materials to be knitted into the fabric, such as stiffening monofilaments and/or thermoplastic materials to be added and later activated, attachments to reinforce the structure.

Figure 17:
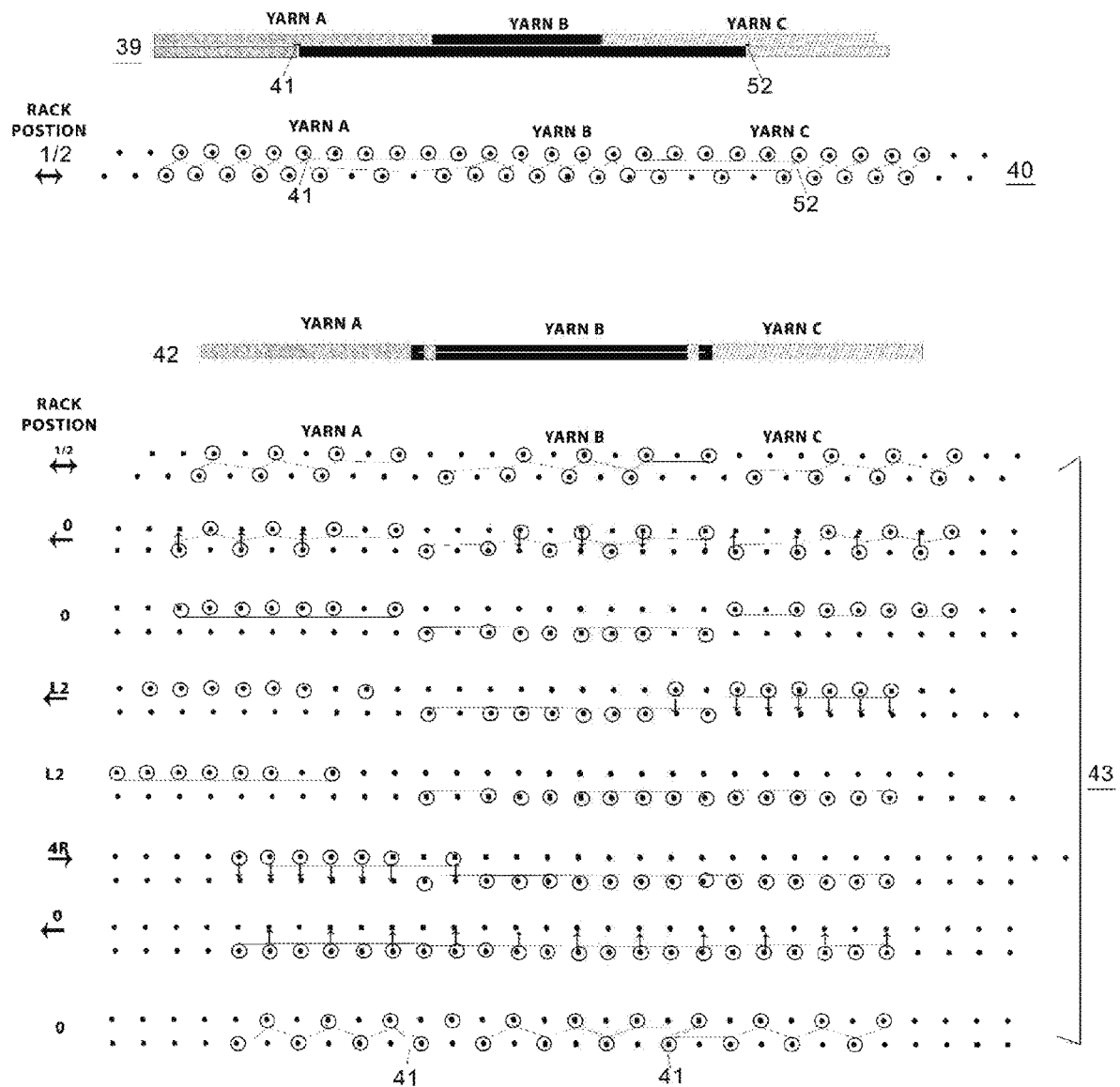
FIG. 17 illustrates an overlap intarsia half gauge rib tongue.

Conventional half-gauge jersey-based fabrics do not connect the fabric on opposing needle beds, but rather jersey loops are manipulated to empty interstice needles on the opposing bed. Jersey-based stitches pose a considerable challenge to creating stable articles of footwear themselves, typically requiring several post processes to apply other structural materials and/or sewing applications to the interior and/or exterior of the upper to create a footwear structure capable of holding a foot onto a sole consistently. Half-gauge sock-like jersey fabric is fifty percent less dense. Thus, a machine with 14 needles per inch becomes coarser, by using only 7 needles per inch in the same space. Jersey by itself would appear an impractical standalone choice of structure without additional reinforcing material applied. Half-gauge jersey would appear twice as impractical a stand-alone choice of structure for an upper, without significant reinforcing applications. Double bed fabric such as rib, cardigan, full cardigan, half-gauge jacquard, and other half-gauge double bed stitches can also be made in this half-gauge manner on V-bed flat machines through shaping half-gauge versions of these double-bed fabrics on four needle beds 31. FIG. 17 illustrates an overlap intarsia half gauge rib tongue.

However, transferring loops between the two needle beds has limitations of racking one to two needle positions in either direction. Racking is the shifting of one-needle bed a given number of needle positions to align a selected stitch or group of stitches to its new destination on the opposing bed. Racking more than one to two needles of half-gauge double-bed fabric (the width of the selected loop itself and its adjacent empty neighbor needle) risks ripping out the stitches and potentially destroying the needle hooks themselves.

Current uppers that are knitted to shape integrate stitch elements. These integrated stitch elements are typically double bed knitting structures configured as single-layer structures integrated into the main body of an upper, using traditional knitting techniques borrowed from knitted apparel industry. These traditional knit stitch structures are limited by the mechanical capabilities of standard two-needle bed machinery. As shown in FIG. 17, an upper element includes an integrated intarsia rib tongue 39, and the intarsia structure (as referenced in its respective loop diagram 40) is connected on each intarsia edge by a tuck join 41. Each intarsia edge overlaps on the face of either side by a small section of jersey or interlacing rib fabric structure.

Similarly, a racked intarsia rib structure 41 (intarsia tuck join) also creates a single layer fabric. Each side of a three field intarsia rib structure 43 is fashioned-in 43 (a rack intarsia jersey sequence loop diagram), depositing the loops from one side on top of the tongue (instep) fabric by racking (shifting) one-needle bed of the two-needle bed V-bed knitting machine, transferring the loops of the rib layout to the front bed in the instep and the rear bed for the side intarsia fields, and then depositing the loops sequentially from one side and then the other, onto the static central tongue fabric structure, and then returning the loops to the rib layout. As shown by the racked intarsia jersey rib structure 42, this knitting technique uses three fields of intarsia and a rib layout to overlap knitted structures into one another, by leaving empty needle spaces and then transferring loops into the empty spaces in the adjacent intarsia field, joining them in the next knitting sequence with a with a physical tuck join 41. The width of the overlapping intarsia join area is limited to the maximum mechanical reach of the racking wheel on the V-bed knitting machine (two inches in either direction, twenty-eight needles total on a 14-gauge machine. These fashioned-in overlapping structures 39 and 42 created on the two-needle bed V-bed knitting machines must be transferred into jersey (single bed) structures 43 or knitted as half-gauge (1×1 rib) double-bed structures, knitting every other needle on opposing beds, or a half-gauge tube, also FIG. 16, in order to allow for the manipulation of the loops, transferring them systematically in the course of several traverses of the machine, into empty opposing needles, until the structure is shifted to its final destination 37.

According to embodiments of the present disclosure, an insert of one or more independent constructions is implemented into the unitary knitted structure of a footwear upper, utilizing a four-needle bed technology. The four-needle bed technology allows for the insertion of one or more structures to be input flush and/or overlapping, vertically, horizontally, or diagonally into a main body structure. The limit of an inserted structure is the width of the available needle bed. On a fourteen-gauge (fourteen needles per inch) machine, with fifty-inch needle wide beds, this insertion and/or overlap limitation can be nearly seven-hundred needles.

Figure 18:
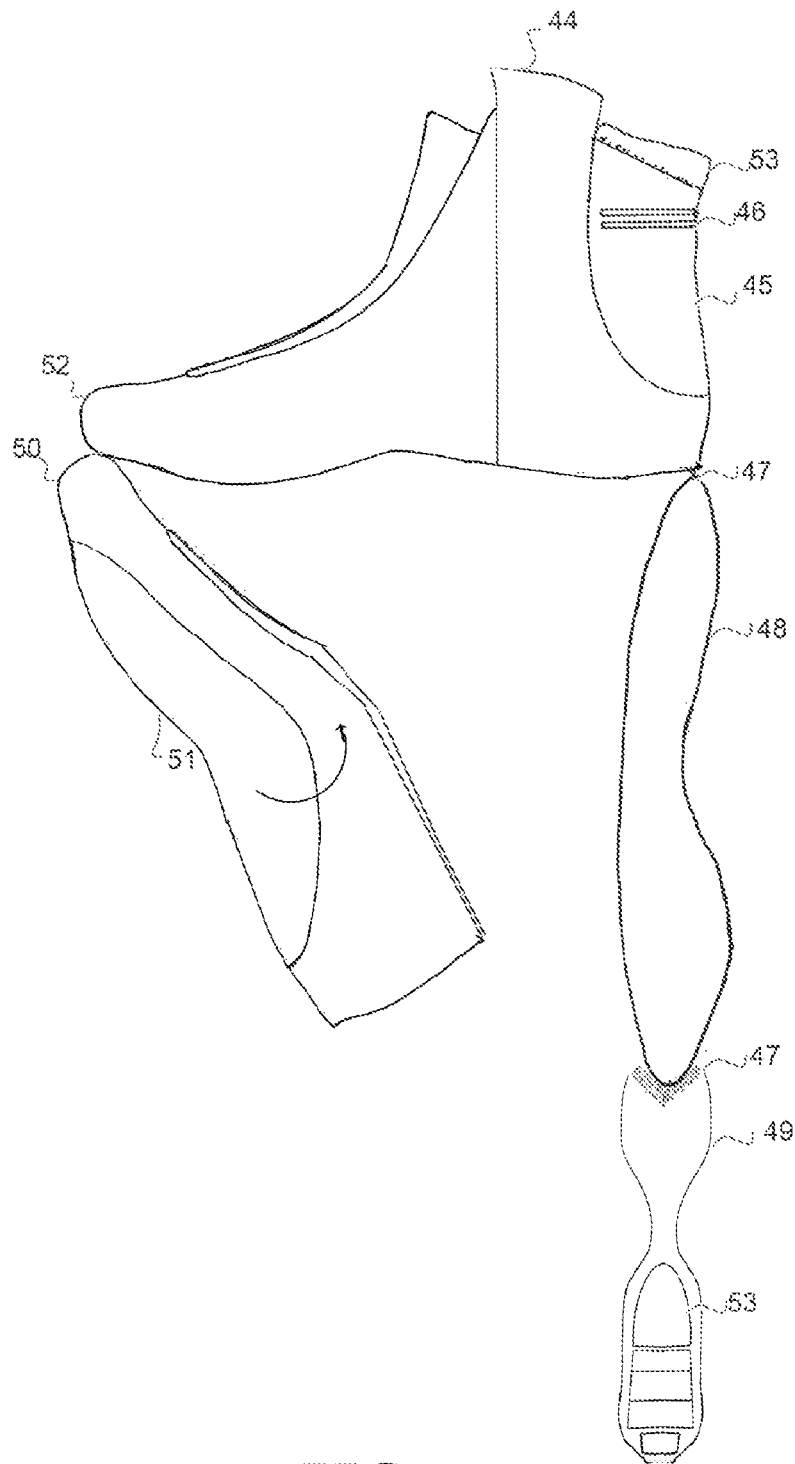
FIG. 18 illustrates an exemplary shoe upper with multiple appendage structures and layer portions resulting from an integrated knitting process in accordance with an embodiment of the present disclosure.

FIG. 18 illustrates an exemplary shoe upper with multiple appendage structures and layer portions resulting from an integrated knitting process in accordance with an embodiment of the present disclosure. The insert could be the entire width of an upper, or the length of a boot shaft if knitted turned cloth. As shown, the insert 44 may have an intarsia element 45 and/or a texture 46. The insert may combine other appendages, for example a live hinge 47 and an insole or a Stobel liner 48. Attached to the Stobel insert may be another live hinge attached to an appendage tongue 49. Attached to the toe area may be an appendage liner 50, perhaps of Kevlar, with an additional side flap appendage of additional Kevlar or other reinforcement material. The knitting machine knits these in an integrated and continuous knitting process, e.g., starting from the heel area of reinforcement liner 50, then the reinforcement flaps, then the toe area of the reinforcement liner. A small waste section, a live hinge or a strand, connects the reinforcement liner to the main body of the upper 52. The machine then knits the appendage tongue 49 with a spacer or terry loop cushion configuration 53, a live hinge, the insole, a bottom liner, or a Stobel liner 48, another live hinge 47, and then the inserts heel 44 with the intarsia element 45, including the texture 46, and finally the terry loop cushion structure 53. The machine then manipulates the heel insert into place as defined for the final product, attaching it to the main body of the upper. To be ready for the unitary construction for the shoe making process, the flaps are folded to the reinforcement liner, the liner is pushed into the main body of the upper. The appendage tongue is folded at the live hinge and pushed into the upper, pulling with it the insole or Stobel liner. The upper is ready for attaching the Stobel in a sewing operation beginning the process.

Figure 19:
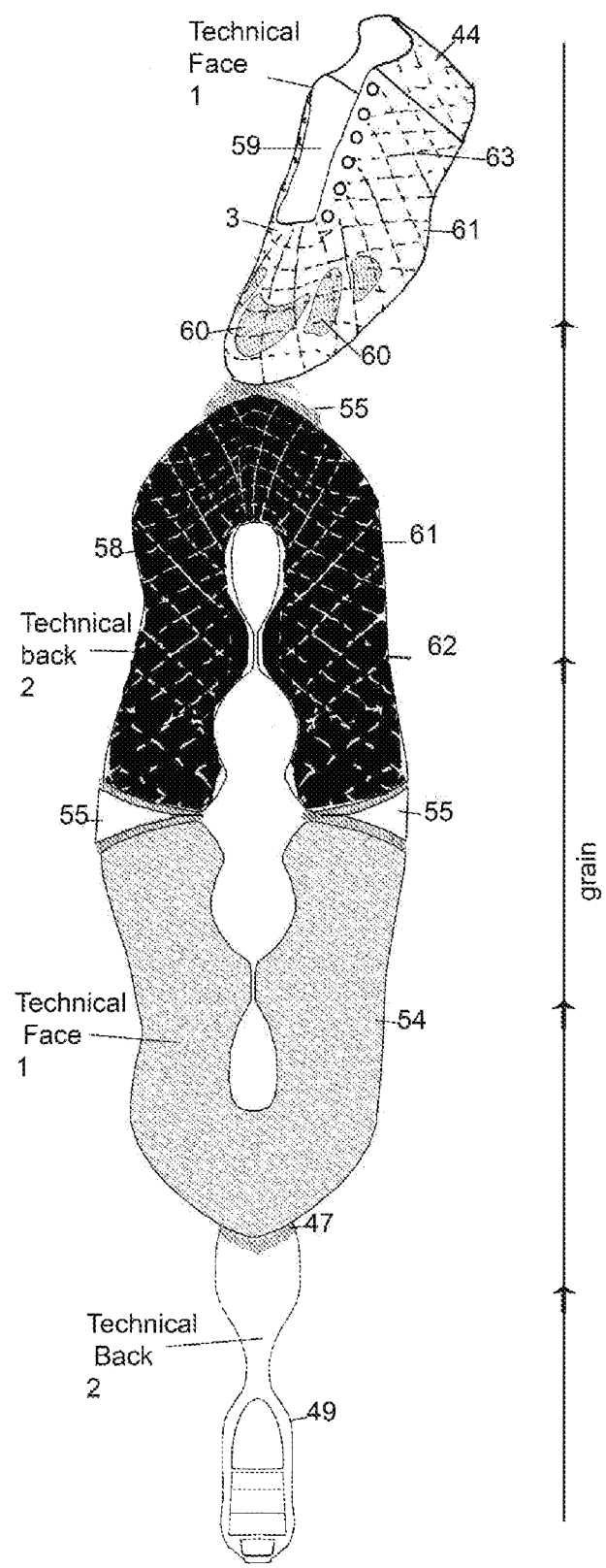
FIG. 19 shows an exemplary multi-layer upper assembly resulting from a knitting process in accordance with an embodiment of the present disclosure.

In one embodiment of this invention, each layer or layer portion of the unitary construction may be knitted sequentially and attached in the same knitting process. FIG. 19 shows an exemplary multi-layer upper assembly resulting from a knitting process in accordance with an embodiment of the present disclosure. The knitted assembly has an intarsia structure and a jacquard application of adhesive knitted in corresponding layers. For example, the knitting process is sequential and starts from knitting a configured tongue structure 49 and proceeds to knit a live hinge waste section 47, and to knit a monofilament performance layer 54, and to knit a shaped dynamic waste section 55, then to knit the outer layer 56 of the upper assembly. A complex intarsia is thus created as a knit design with an adhesive applied in a positive jacquard design 57 on the reverse side (technical back 2). The intarsia layer 58 is attached to a sacrificial section that acts like a live hinge 47, connecting to a seamless Kevlar protective layer (a seamless Kevlar layer with heel insert 59), having pointelle ventilation 60, and an inserted heel structure 44.

Each layer may have a specific performance focus, without being restricted by competing knitting techniques, the mechanical limitations of machinery attempting to knit two or more complex structures simultaneously, or the restrictions of material characteristics of adjacent layers or layer portions, which may have physical properties that are dynamically opposed. In the example in FIG. 19, a complex intarsia layer 58 may require all the available knitting systems, with each knitting system dedicated to specific intarsia feeders. Another layer portion may be all Kevlar shaped in a seamless unitary construction 59, with differing textures that are anatomically mapped around the front of the foot for protection, and having an inserted heel grain 27 different than the main body grain 28 for anatomical comfort, but also having some of the areas of the layer configured with pointelle mesh 60 for ventilation.

Pointelle mesh 60 requires transferring loops. Knitting cannot mechanically occur in a system that is in the state of transferring. Therefore, that system in transferring is not available for adding loop structure. Additionally, a needle bed racks (moves) one or more needle positions, as previously described, to transfer (shift) one or more loops to an opposing needle bed to create the ventilation hole. Typically, in the time of racking a needle bed, no loops are added to the length of the fabric and the machine stroke is dedicated solely to transferring of loops. This is otherwise known as an empty row, meaning no loops are added. The more empty rows in a fabric structure, the longer the fabric takes to produce (less productive). Additionally, some materials, such as Kevlar have extremely limited stretch capabilities to transfer or manipulate loops, whereas wool or polyester, which is commonly used in shoe uppers, may stretch several needles wide with no problems. Combining a stretch resistant material with a material that does stretch in two simultaneously knitted structures requires the product design and machine movements to be restricted by the material with the least stretch, or otherwise risk fabric failure and in the case of a material such as Kevlar, damage to the machine.

Knitting separate layers of some materials has advantages. The seamless Kevlar layer 59 in the example FIG. 19 may also have an adhesive material 61 plaited into the face adjacent to the intarsia layer in a positive jacquard 62 pattern (half). The intarsia layer 58 has the negative (opposite) jacquard plaiting design 63 of adhesive. The intarsia layer 58 and the seamless Kevlar layer 59 with a pointelle portion 60 have the opposing designs of adhesive material that dove tail together and are both knitted as individual layers. This allows the machine to efficiently complete each layers' type of fabric in the most efficient way, using all available knitting systems for each, increasing productivity. The resulting upper construction benefits from both structures, while creating the structure densities as light or heavily populated with stitches as each fabrication requires for its specific performance requirements. The intarsia layer 58 may be an aesthetic element of the completed shoe, and the seamless Kevlar layer 59 may be a functional safety element of the completed shoe.

The intarsia layer 58 is attached to the Kevlar protective unitary constructed Kevlar layer 59 with a live hinge structure 47. Similarly, another performance layer, for example a transparent monofilament layer 54, may also be knitted-attached to the end of the intarsia layer 58, with a dynamic waste section 55 that is configured to fit both the end of the intarsia layer and the end of the monofilament layer. A tongue layer portion 49 is knitted at the tip of the performance layer 54, also with a live hinge 47 waste section separating them. The Monofilament layer 54 is folded onto the intarsia layer 58 and the two layers are seamed at the heel. The seamed monofilament 54 intarsia 57 assembly is folded on top of the seamless Kevlar layer 59, and the tongue 47 is folded inside the seamless Kevlar layer 59, origami style. The assembly is then ready for the shoe making process as a unit. When combined, and the facing jacquards of thermal adhesive 61 of the intarsia layer 58 and the seamless Kevlar layer 59 are activated by heat or steam. The mirroring jacquard layout of the adhesive 61 provides that the layers do not separate and function as a unit, while only enough adhesive is utilized not to overpower the upper structure with too much adhesive (fusible) material.

Figure 20:
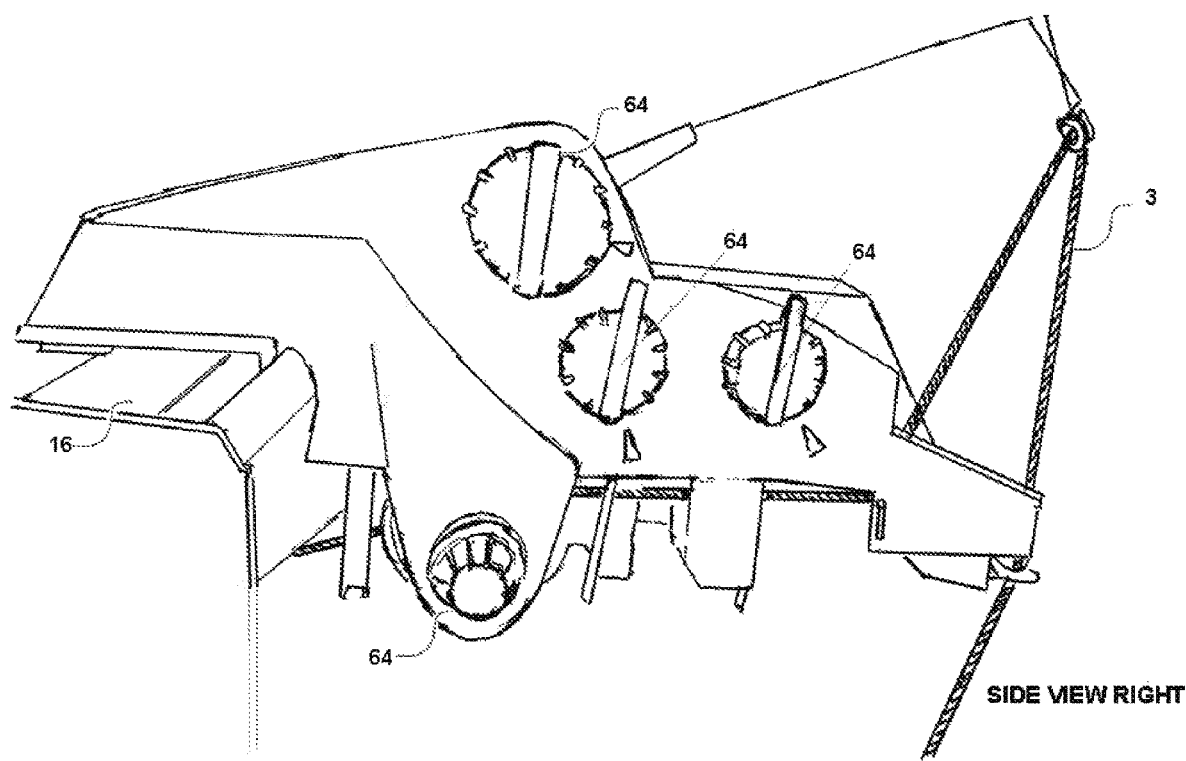
FIG. 20 shows a standard stop motion assembly on a knitting machine.

Specialized materials may be utilized to create a support or reinforcement layer. Unlike common textile materials, such as wool, cotton, polyester and other traditional strands, introducing material strands such as chain, wire, or other materials to a standard OEM knitting machine causes several challenges. Current methods of knitting carbon fiber and other fiber reinforcing textiles, integrating stainless steel, wire, heating elements, chain, or other stiff fibers, pose challenges to the "de-packaging" and feeding of those materials into a conventional knitting machine utilizing standard OEM stop motions and standard OEM feeders. FIG. 20 shows a standard stop motion assembly on a knitting machine. Standard stop motions which are mounted on a stock OEM bar 16 above the needle beds, have built in manual tensioning controls 64. The stock OEM bar 34 has an electronic cable 36 inside a groove, which connects each stop motion to the machine's main computer control system. A yarn strand or a stiff material strand 3 must bend several times through multiple right, obtuse, and acute angles as it passes through these standard OEM fittings, tensioning devices, and guides 17, causing a significant amount of friction, breakage of fiber, excessive wear on the machine parts, drag of fiber slowing down production, and many other complications. Stiff materials, wire, silicon, auxetic yarns, and many other materials are typically packaged on a spool 65, a cylinder, or a cone 9, all of which when stood on an end, deploying material, cause the material to balloon on itself and spiral into a coil. After several revolutions, the spiraling process creates a graduated spring in the fabric and in the slack strand, which is undesirable in and of itself A strand twisting upon itself causes fiber breakage, excess friction and abrasion on the machine parts that touch the fibers, and finally breaking of the strand itself, when it can no longer continue twist upon itself Breakage can usually not be mended on the strand and/or the fabric growing in the machine, and results in waste scrap, production down time, damaged product, frequently damaged machine parts (needles, stop motions, knock over verges, sinkers, sinker, wires and other costly machine parts). Currently, the only alternative is using one of two devices from a machine builder, depending on which machine type the user is utilizing. Machine builders such as Shima Seiki of Japan, and H. Stoll AG & Co. KG of Reutlingen Germany have created unspooling devices to address such "de-packaging" or unspooling of materials on spools, cones, and cylinders which pose such problems. Both companies have large unspooling devices mounted on the floor or beside a machine, which feed a limit of two of these materials into a knitting machine. Simple products using one or two strand feeds, fed into a standard knitting machine are possible, using expensive additional unspooling equipment available from knitting machine manufacturers.

Figure 21:
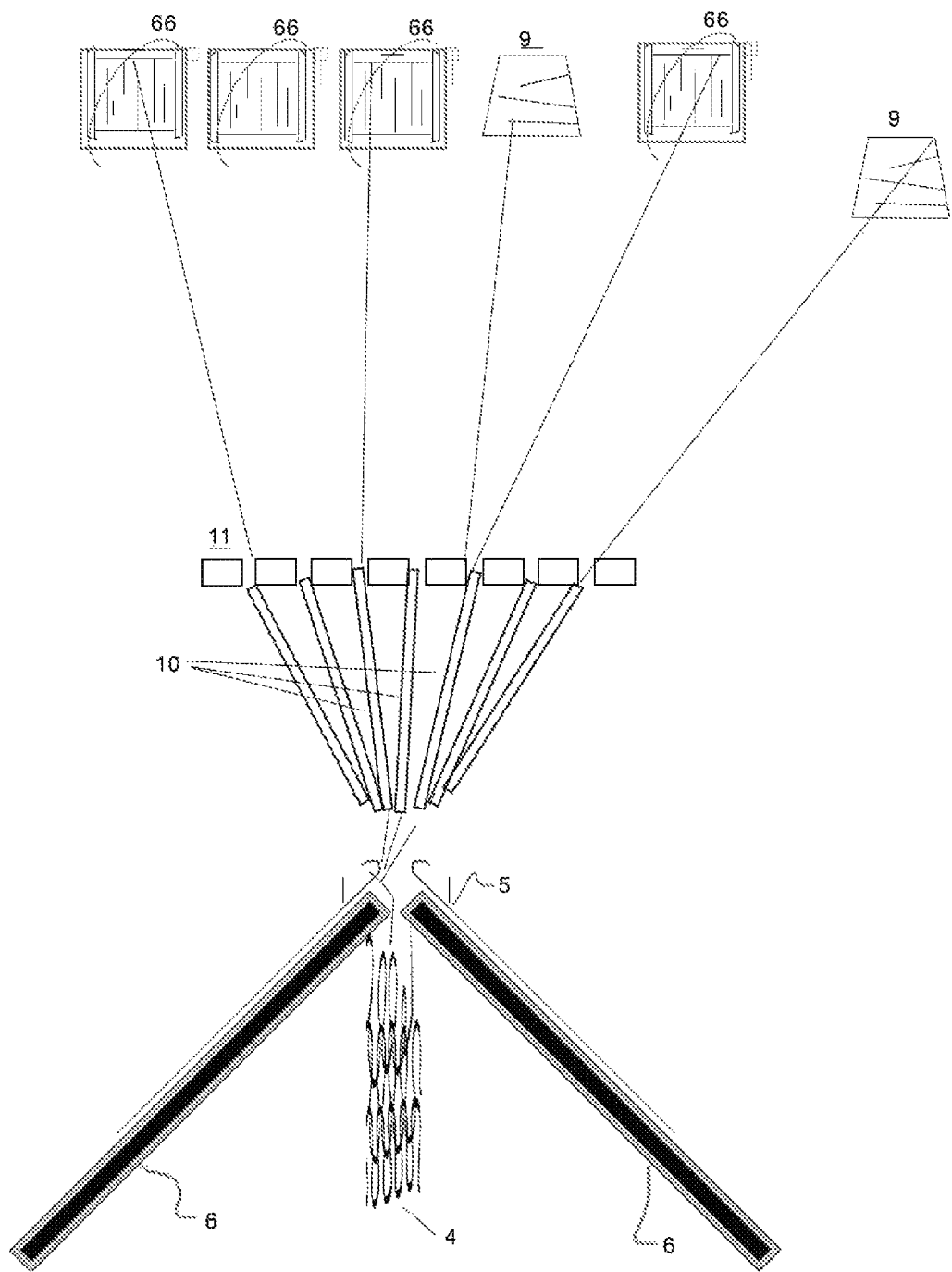
FIG. 21 shows a side view of a knitting machine with a plurality of spools and cones.

However, knitting a more complex structure, using more than two strand feeds on standard machine builder equipment is not possible. To create more complex structures, such as that required to create a performance layer or layer portion in an article of footwear, an automatic unspooling device may be required to unspool carbon fiber, Kevlar, Nomex, certain monofilaments, braids, silicon, high heat resistant ceramics, vitreous silica fibers, thermo coupling wires, metal, braids, aramids, para aramids, auxetic, fiber optic, adhesive materials, thermo plastic material, elastic, ligamental, and other specialized materials to enhance the performance of a shoe. FIG. 21 shows a side view of a knitting machine with a plurality of spools and cones. One or a plurality of unspooling devices 66 may be mounted on one knitting machine to drive a plurality of strands of carbon fiber, wire, or other special material strands off one or a plurality of spools 65, cones 9 or other packages, in coordination with the movement of the knitting machine's feeder system 10.

A weft knit warp feed system allows for integration of one or more stands, horizontally, vertically, and diagonally into the body of a base fabrication, onto one technical face and/or the other face, or on the interior of single or a multi-component, multi-layered structure by knitting, inlaying, floating, and tucking one or more strands. The effect of strand/orientation on footwear upper material properties is an important factor in the strategic design of the shoe making process and also the resultant performance and aesthetics of article of footwear.

The material moving along the feed rails 11, and the pulled yarn knitting a plurality of courses result in production of rows of fabric 4, which are shaped by the pattern program in the knitting machine memory, into a series of completely finished knitted layers of the upper, each layer being a unitary construction. Particularly, the knitted layers have finished edges and therefore do not need cutting and sewing to form the footwear upper.

Figure 22:
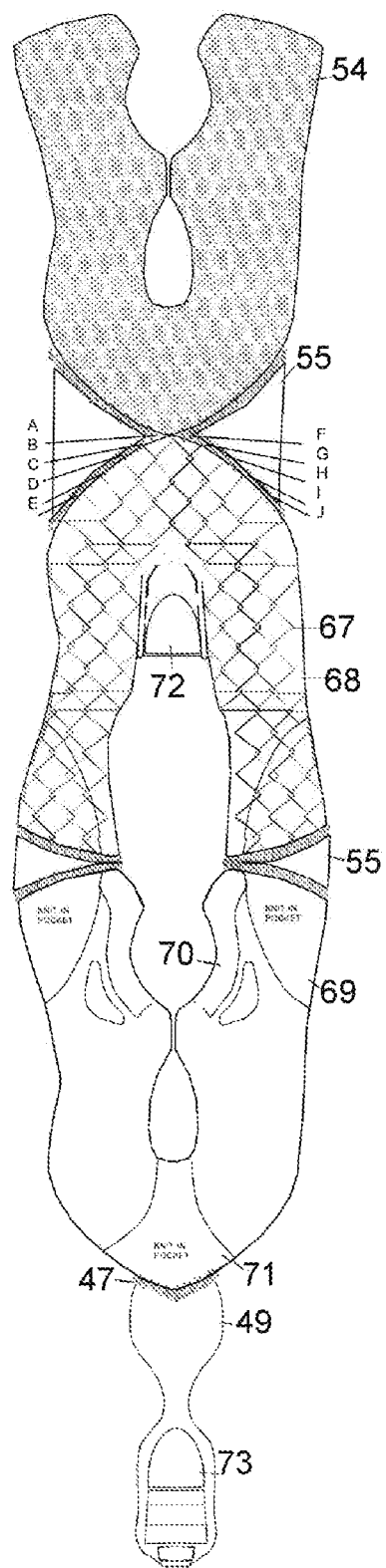
FIG. 22 shows an exemplary weft knit warp layered functional upper assembly resulting from an integrated knitting process in accordance with an embodiment of the present disclosure.

According to embodiments of the present disclosure, several materials such as auxetic or reinforcing materials may be unspooled and positioned into one or more layers, layer portions, components, and/or plies. FIG. 22 shows an exemplary weft knit warp layered functional upper assembly resulting from an integrated knitting process in accordance with an embodiment of the present disclosure. An example of adding rigidity is adding aramids and para-aramid materials, which may be inlaid in the knit structure, reinforcing one or more zones horizontally or vertically as a weft knit warp structure. Spreading performance strands such as reinforcing yarns 67 in thin geometric and anatomically arranged positions by inlaying these strands together within a main body knitted fabric (e.g., weft knit warp layer 68 in FIG. 21) allows ultra-lightweight fabrics to be knitted with these performance strands aligning fiber for extra strength, ligamental strength, and/or other performance characteristics where needed. Inlaying multiple strands has several benefits, including creating a desirable mechanical performance, while reducing the amount of excess material in the upper.

According to embodiments of the present disclosure, performance strands may be integrated as weft knit warp strands into a footwear upper layers, layer portions, components, and/or plies, horizontally, vertically, and diagonally by any combination of knitting, inlaying, floating, and tucking. Stiff performance strands may be integrated by utilizing the unspooling feed system (66 in FIG. 21). FIG. 21 shows the arrangement of multiple spool devices on an exemplary knitting machine in accordance with an embodiment of the present disclosure.

Performance strand materials may be anatomically, mathematically and proportionally arranged to hold a foot in motion to a sole. They may be incorporated as weft knit warp structures, where a stand is inserted. Impact easing strands such as auxetic, silicon, and elastic materials may also be integrated by utilizing the unspooling feed system to ease any impact of motion as in running, jumping or sliding. In some embodiments, a three-dimensional V-bed knitting process creates multiple structures in the same panel structure and utilizes various materials strategically, and/or mathematically and proportionally, placed for specific characteristics to improve the shoe manufacturing process and/or function of the resultant shoe, such as materials to add strength to specific areas, temporary supporting sacrificial material that disappears in the shoe making process, elasticated material that creates flex joins or live hinges 47 in the knit structure, material that expands 70 with the addition of heat and/or steam to support structures, shape memory material, vibration dampening material such as auxetic yarns, materials that create clean edges around voids or create cavities of reinforced shape, dimension, and positioning in the resultant shoe structure 71 for housing inserted components; materials strategically placed to shield RF or EF; and electronic cables and/or thermo coupling wires that permanently situate connection spots in the resultant shoe upper ready for post process hardware components such as electronics, solar elements, power sources, GPS, RFID, cameras, controls, speakers, screens, monitors, or other devices.

According to embodiments of the present disclosure, the knitting machine may utilize a knit program to incorporate one or more pocket structures 69 knit into one or more layers, layer portions, components, and/or plies, where a component is inserted in an post process or between the needle beds of the knitting machine and into the pocket during the knitting process, manually or robotically; the knitting machine then continuing and sealing the component into the knit structure. The component may be any component, for example an electronic component, an RFID sensor, a ballistic plate, a foam, computer chip, a printed circuit board, a battery, or other component. The pocket may be completely closed or have an opening, void, flap, or other structure allowing access to the embedded component. An element may be created in a shoe upper in two or more components, where a portion of component 72 is attached to one layer and another portion 73 is incorporated into one or more layers. When layers, layer portions, components, and/or plies are gathered, folded, or plied together the assembly creates a whole functional component. In FIG. 22, half of a terry looped cushion structure 72 is incorporated into a reinforcing layer, and another portion 73 of the terry loop cushion layer is incorporated into an appendage tongue structure 49. It's important to the stability of the tongue and the reinforcement layer that this assembly be joined together to stop the tongue from sliding around in a completed shoe, and for the reinforcement layer to remain stable and in place in the finished shoe upper.

Support fibers may be knitted, which expand when exposed to heat or steam, creating dimension, insulation, further reinforcement, and/or increased stitch density. Density of fibers may be manipulated by the machine into zones, and created in a gradient, latticed, layered, weft knit warp insertion or any combination of knit structures. The computer-controlled knitting machine consistently and repeatedly manufactures the same fiber reinforcing parts for as many and as few as desired. A weft knit warp insertion is a structural element or group of elements knitted into one or more layers, layer portions, components, and/or plies, and arranged for enhancing performance characteristics of a shoe construction by anatomically, mathematically and proportionally positioning strands that travel in multiple directions.

Figure 23:
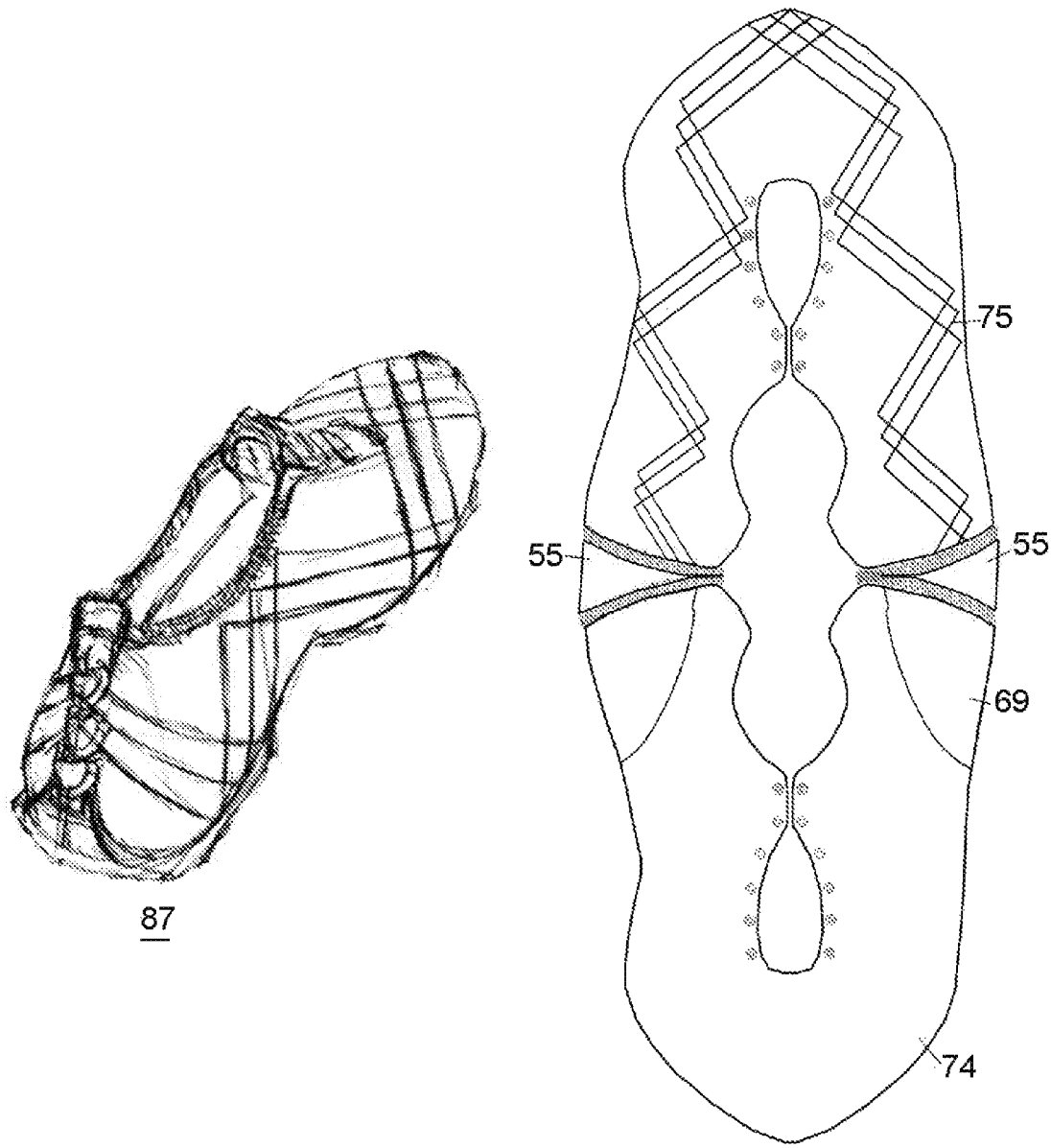
FIG. 23 demonstrates an exemplary upper assembly with a functional interior liner resulting from an integrated knitting process in accordance with an embodiment of the present disclosure.

FIG. 23 demonstrates an exemplary upper assembly with a functional interior liner resulting from an integrated knitting process in accordance with an embodiment of the present disclosure. For example, the interior liner may have a moisture wicking base fabric 74 and a percentage of TPU yarn. If knitted on a multi-gauge V-bed knitting machine, this layer's stitch density (from half gauge knitting 31) may be half as dense as the mirroring attached outer layer's fabric to reduce weight, create ventilation, and allow the TPU yarns to melt creating an adhesive, holding the assembly together. The pocket area 69 in the heel can receive an insert component. The outer layer may be a more dense material construction for aesthetic and functional purposes.

A group of weft knit warp strands 75 traverse multi-directionally as a group arranged anatomically mathematically and proportionally from the toe dart through the mid foot, medial and lateral ankle areas to the heel of the second layer. The two layers are attached by a dynamic waste section 55. The two layers when pressed together like a "clam," assembled and heated in the shoe making process create a strong light weight shoe upper (e.g., the weft knit warp strand finished upper assembly 87) that is also comfortable.

Figure 24:
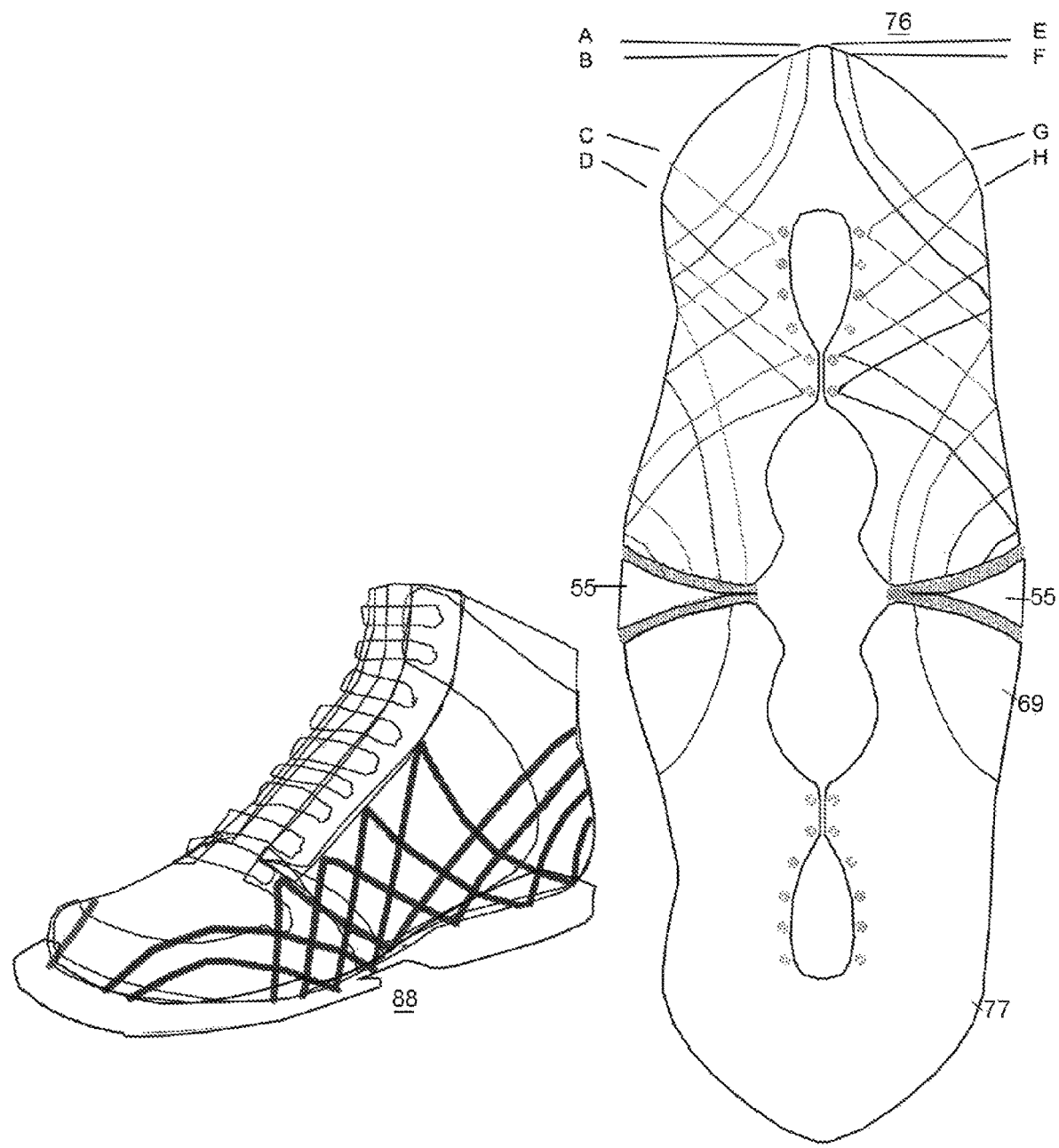
FIG. 24 shows an exemplary shoe upper assembly with reinforcing weft knit warp strands traversing in separate directions as a result of an integrated knitting process in accordance with an embodiment of the present disclosure.

FIG. 24 shows an exemplary shoe upper assembly with reinforcing weft knit warp strands traversing in separate directions as a result of an integrated knitting process in accordance with an embodiment of the present disclosure. In FIG. 24, eight individual weft knit warp strands 76 (A through H) travel multi-directionally, but separately, arranged anatomically mathematically and proportionally from the toe dart through the mid foot, medial and lateral ankle areas to the heel of the second layer. This weft knit warp arrangement may for example help prevent ankle rollover for side-to-side lateral sports movements. The base material in this layer may be a polyester strand plaited on the reverse face with a low temperature melt polymer, such as PPS (Polyphenylene sulfide), which, when heated, the PPS stitches blend together on the back of the fabric creating a barrier to liquids. The two layers are attached in the knitting process by a dynamic waste section 55. The two layers when pressed together, assembled and heated in the shoe making process create a strong light weight shoe upper that is also comfortable. The interior liner has a moisture wicking base fabric 74 and a percentage of TPU yarn. When plied together, the assembly results in a strong upper with reinforcement to assist in ankle roll over (e.g., weft knit warp strand finished upper assembly 88 with anti-roll over strands in multiple directions).

The double layer assembly layout is versatile and is configured in a different way, where the layer-based materials could be switched and the layer with the weft knit warp strands is placed on the interior of the shoe where it's not visible to the wearer, optionally with some pointelle holes for ventilation. The other layer may contain the TPU and polyester, the polyester arranged in an aesthetic design optionally including jacquard, texture, welt, intarsia, or any combination of aesthetic or functional elements. In this example there are eight strands (A through H) however, there may be as many strands as the machine systems will allow.

Figure 25:
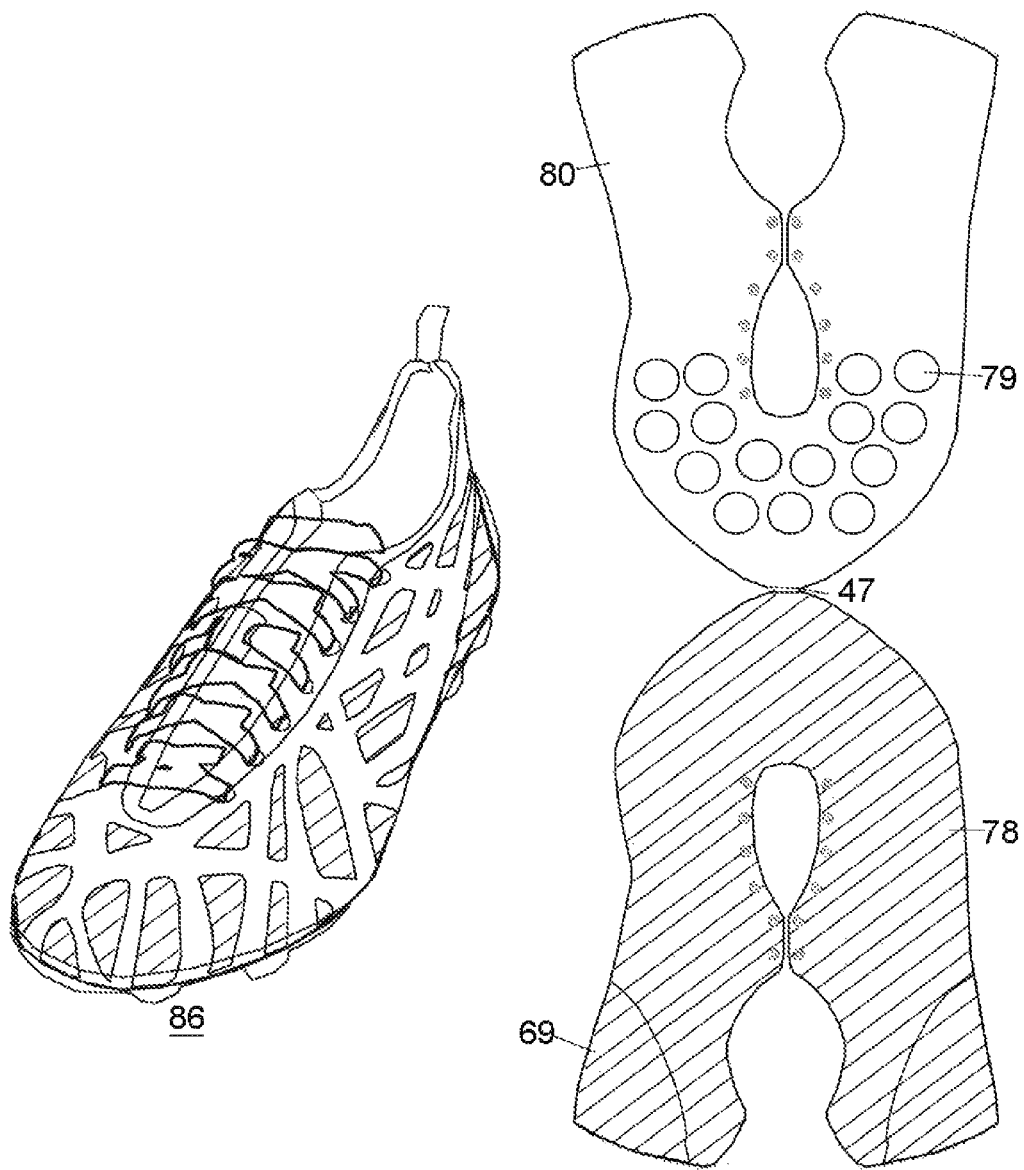
FIG. 25 shows an exemplary upper assembly with a lattice structure as a result of an integrated knitting process in accordance with an embodiment of the present disclosure.

FIG. 25 shows an exemplary upper assembly with a lattice structure as a result of an integrated knitting process in accordance with an embodiment of the present disclosure. FIG. 25 demonstrates another embodiment of a bi-layer assembly, where the layers are knitted toe to toe, attached by a live hinge 47. The underlayer may contain pockets for inserts 69, with a base layer of aesthetic elements 78. The upper layer 80, which will be placed on top of the assembly, may have different materials and/or aesthetic elements. Those elements may include apertures created with transparent, fusible, or thin yarns and/or voids 79 where there is no fabric. The layers, when folded together and heated in the shoe assembly process, reveal the underlayer elements through the voids of the finished upper layer 86.

Figure 26:
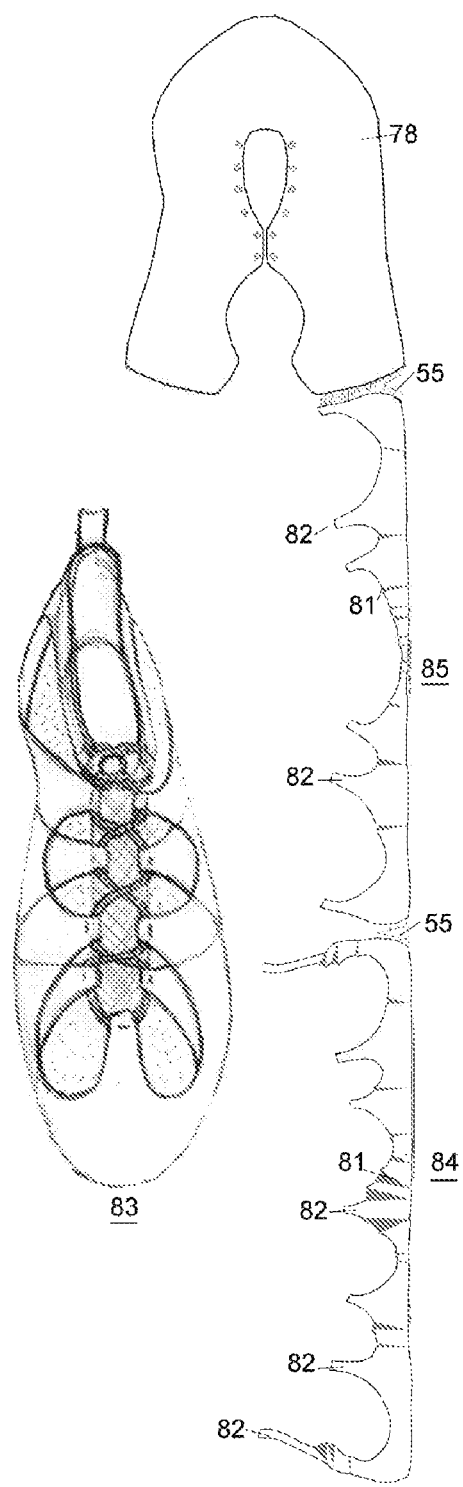
FIG. 26 shows an exemplary upper assembly with multiple component strips with tabs knitted turned cloth resulting from an integrated knitting process in accordance with an embodiment of the present disclosure.

FIG. 26 shows an exemplary upper assembly with multiple component strips with tabs knitted turned cloth resulting from an integrated knitting process in accordance with an embodiment of the present disclosure. The layers each have an individual function. A first layer portion 84 may be knitted as a turned cloth strip shaped layer with short row darts 81 and may have appendages, such as knit tabs 82 to hold a lace or cord strategically placed to coordinate with a second strip 85, attached by a dynamic waste section 55, to the first strip. The second turned cloth strip 85 may also be knitted with short row darts 81, and also which may have appendage tabs 82 that coordinate with both the first shaped strip 84, and an underlayer 78 with an aesthetic or functional element and perhaps an adhesive strand and/or thermoplastic material such as TPU is also knit into the element.

The second strip is also strategically attached in the knitting process to the under layer 78 by a dynamic waste section 55 at the point the second strip may be gathered and wrapped around the under layer, and next the first strip is gathered wrapped around the assembly also meeting at the heel. Both strips may be attached when the heel seam is sewn, and the dynamic waste discarded. A bottom liner is attached to the assembly. When pressed together, the layers and layer portions form a functional upper (e.g., an assembled shoe 83 with multiple gathered structures), where the coordinated tabs hold a lace or cord in a mathematically and anatomically arranged position.

A tab may be knitted in various constructions, including for example with a tube on the end of the tab used to thread a strand, cable, braid, cord or other material. In another example, a tab may be knitted as a single layer tab, folded in a later process and sewn, welded, glued, embroidered, or otherwise attached to itself to create a tube to thread a strand, cable, braid, cord or other material.

Figure 27:
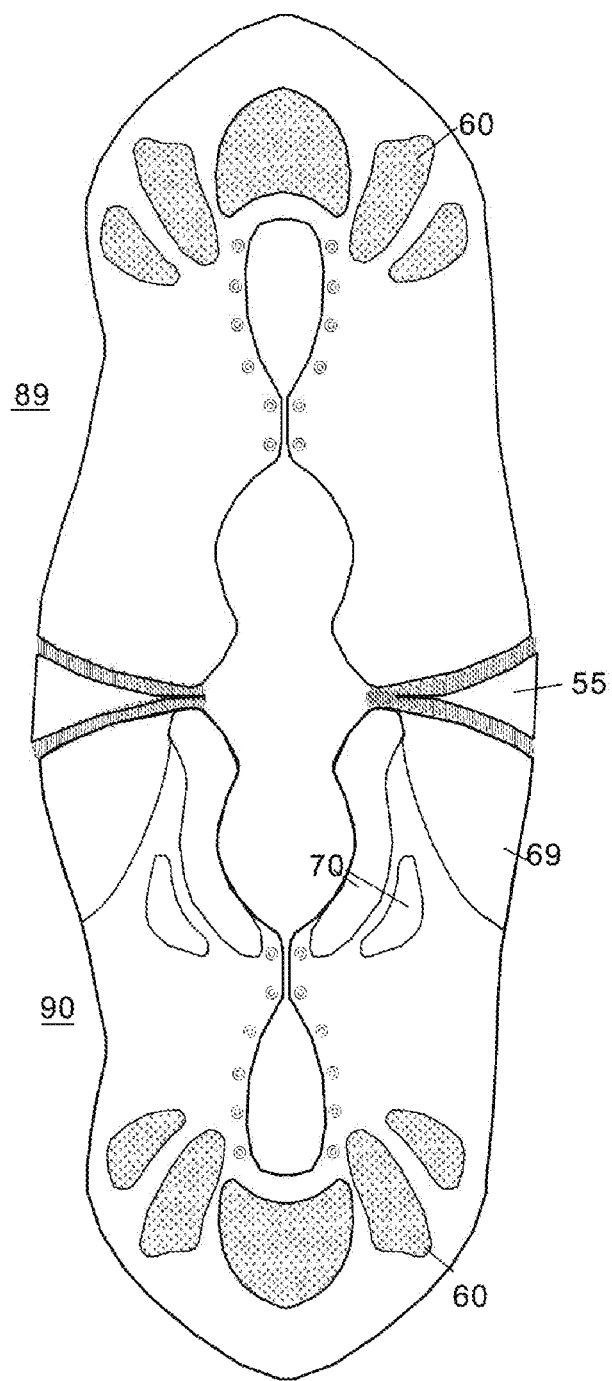
FIG. 27 shows an exemplary upper assembly with aligned layers resulting from an integrated knitting process in accordance with an embodiment of the present disclosure.

In some embodiments of this invention, an upper assembly may have layers, layer portions, components, and/or plies with selected structures that align, rather than all. FIG. 27 shows an exemplary upper assembly with aligned layers resulting from an integrated knitting process in accordance with an embodiment of the present disclosure. The construction has an interior layer 89 which may be of a strategic material function type and also incorporate an aesthetic element, such as a microfiber, e.g., in a neon color attached by a dynamic waste section 55 to an outer layer 90. The outer layer has a multifunctional structure. The functions may include a surface design jacquard, texture, intarsia, or color interest, a pocket 69 for inserting a component, an expandable material in a terry loop cushion structure 70, and a pointelle mesh 60 for ventilation. The pointelle mesh on the outer layer 90 corresponds to the pointelle mesh 60 on the interior layer for perhaps two purposes: first to provide uninhibited ventilation from the inside to the outside of the shoe, and second, to provide a contrast color, peaking through the outside layer 90 from the interior layer 89. The interior layer 89 only has the common shape and pointelle mesh with the outside layer. One or more layers may be knitted with a decorative pattern, such as a registration trademark, or any other pattern.

Figure 28:
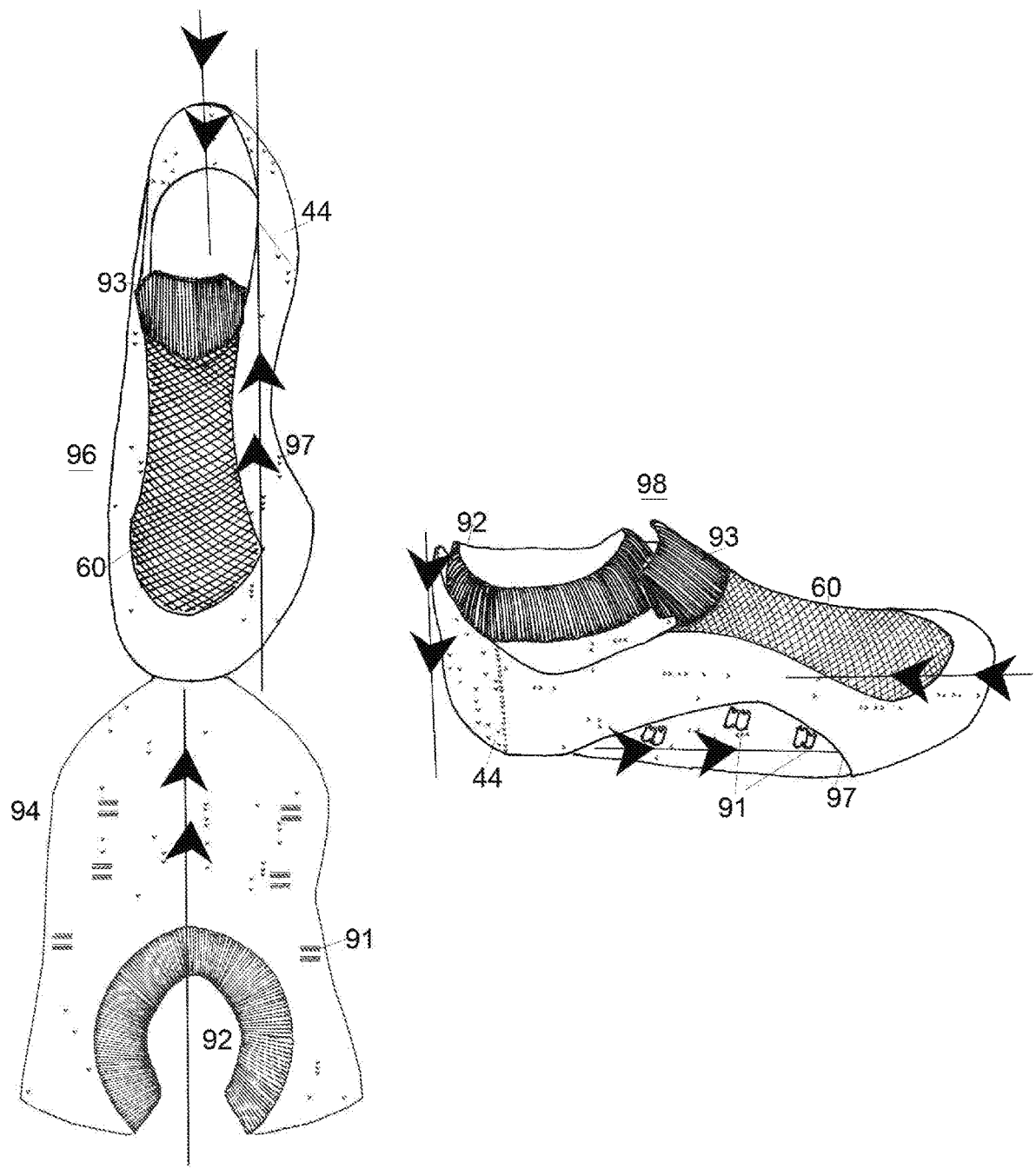
FIG. 28 shows an exemplary upper assembly with a seamless upper portion revealing an under-layer function resulting from an integrated knitting process in accordance with an embodiment of the present disclosure.

In another embodiment of the present invention, a bottom layer may have multiple functions, including functional knit structures, such as standard English or French welt 91 structures, pockets, channels, terry loop cushion structure, etc. FIG. 28 shows an exemplary upper assembly with a seamless upper portion revealing an under-layer function resulting from an integrated knitting process in accordance with an embodiment of the present disclosure. The underlayer 94 may also have differing edges 95 from the upper layer, including a full rib collar 92 for comfort or other structure for function or aesthetics (93 shows a portion of a rib collar). The exterior portion of the assembly may be a layer portion created with an insert 44 at the heel, upper cutout edge 95 exposing the ankle under structure, lower cut out edge 97 exposing the welts 91 creating a seamless structure as a portion of a layer 96, and having pointelle mesh 60, which are ventilation holes, exposing portions the under layer. The remainder of the seamless outer layer 96 may have color and/or jacquard, texture, and/or intarsia aesthetic interest. The entire assembly is finished into an upper displaying both inner and outer functions and contrasts 98.

The machine computer control system may have a memory storing a program that can control automatically knitting multiple substantially identical layers of fully finished three-dimensionally knitted footwear upper, each layer individually produced in a sequential production manner. Each subsequent upper layer is linked to the preceding layer, or daisy chained together with a strand of material. The strand of material may be a thermos plastic fiber that, when heat or steam is applied, the material dissolves and/or evaporates, and so the upper materials separate from any waste or connecting strands. The layer forms may be corresponding mirrored shapes knitted opposing each other or connected toe-to-toe with live hinge as in FIG. 25 or heel to heel with a dynamic waste section as in FIG. 27 or attached sequentially as in FIG. 22. All configurations create knitted component layers, layer portion, appendages, and/or ply structures that when gathered, folded and/or plied together, and any waste removed, the pieces create a full footwear upper, ready for the following shoe making process.

According to embodiments of the present disclosure a V-bed three-dimensional integrated knitting process may create multiple structures in the same layers, layer portion, appendage component, and/or ply with specific structures or combinations of differing constructions, varying thicknesses, and varying materials where required. An upper assembly may include many varied structures including but not limited to appendages, voids, short row darts, inserts, pockets, ventilation, sub structures, super structures, and liners. All layers, layer portions, appendages components, and/or plies may be knitted in the same knitting process. The machine may short row dart or insert fabric structures together in desired strategic angles. Each upper assembly structure may have several components which may be knitted in order or partially at different times, depending on construction. Appendages, liners, and/or dimensional reinforcement constructions may be perpendicular or aligned to the grain of the main body structure.

Figure 29:
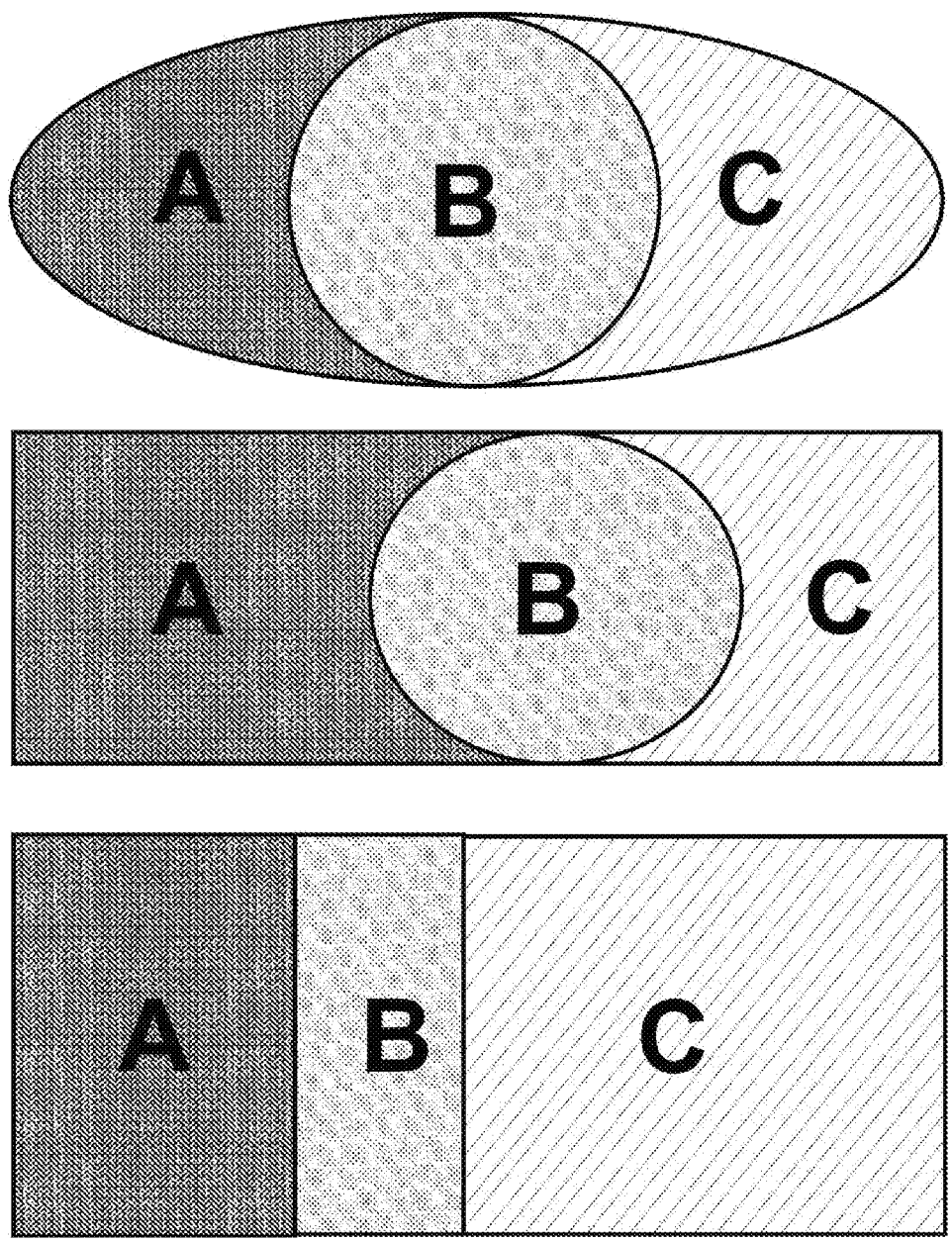
FIG. 29 shows an exemplary intarsia structure generated in a knitting process in accordance with an embodiment of the present disclosure.

An upper assembly structure may be a solitary material structure, or it may have two or more fields of intarsia. FIG. 29 shows an exemplary intarsia structure generated in a knitting process in accordance with an embodiment of the present disclosure. In intarsia, a material knits solely in one field but not others. Or a material may knit in some fields, but not all. A field may be inset, surrounded on all sides by one or more fields, or it may extend the length of the panel. There may be two intarsia fields in a layers, layer portion, appendage component, and/or ply or as many as knitting feeders allow. The fields are joined by a knitted, tucked or transferred stitch. One or more edges of each field may be straight or irregularly shaped. One or more edges of a layers, layer portion, appendage component, and/or ply may be straight or irregularly shaped.

Figure 30:
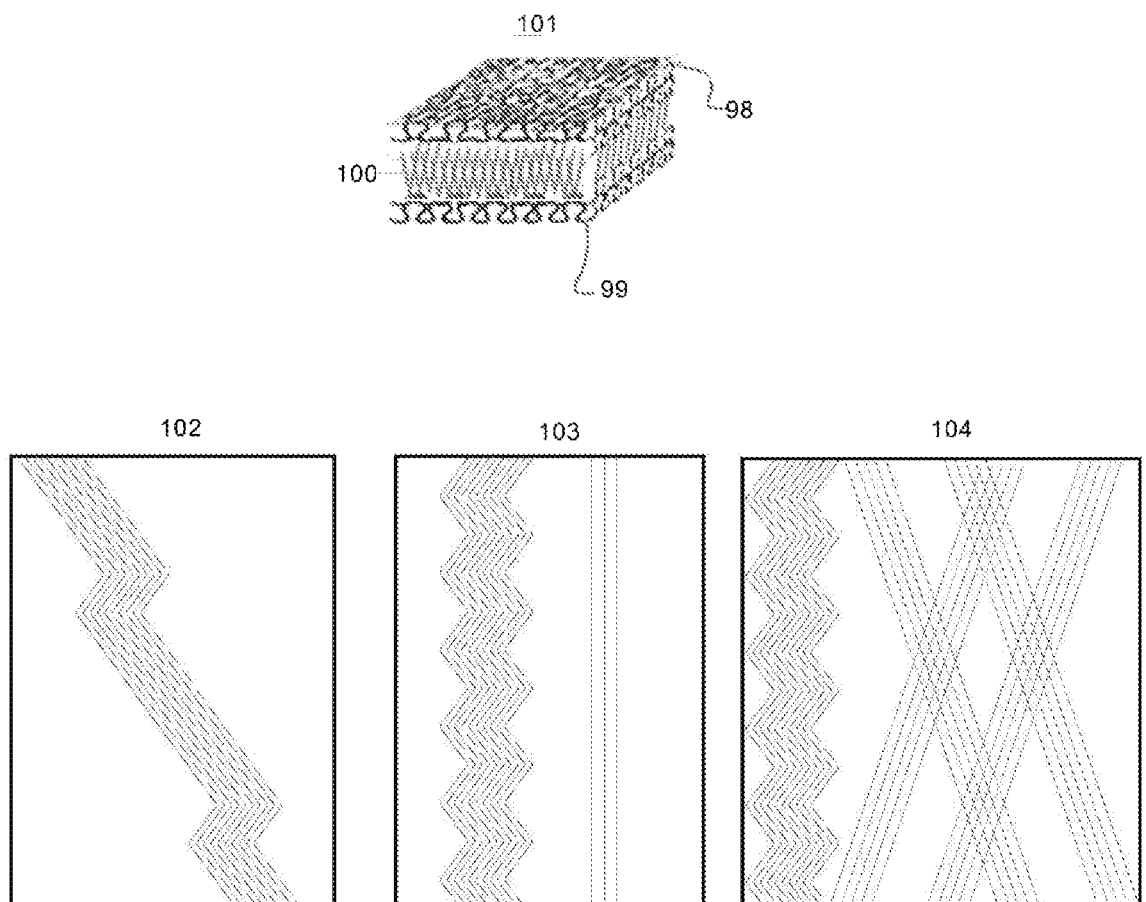
FIG. 30 shows an exemplary weft knit warp insert and spacer structure, each generated in an integrated knitting process, in accordance with an embodiment of the present disclosure.

FIG. 30 shows an exemplary weft knit warp insert and spacer structure, each generated in an integrated knitting process, in accordance with an embodiment of the present disclosure. The fabric structure, e.g., a spacer fabric 101, has a face fabric structure 98 and a rear fabric structure 99. The two structures are connected together by a series of tuck X's or V's of an internal material 100. The spacer 101 may have different properties on the face fabric from the rear fabric. The internal material may have a different property entirely form the other two materials, or may be a combination of materials having a specific performance characteristic, when combined. One or more parts of the spacer may contain fields of intarsia, with each intarsia material having differing colors or properties.

As previously described, a knitted upper assembly may itself have additional reinforcing structures, auxetic, aesthetic, or other inserted materials in one or more layers, layer portions, appendages components, and/or plies. These may be in the form a weft knit warped material inserted vertically, horizontally, and diagonally into a fabric panel or a horizontal inlay. The weft knit warp may knit, tuck, and/or inlay in any combination of stitch structures in one or more layers, layer portions, appendages components, and/or pies. They may be inserted separately as in FIG. 24 or work together as a group, as in FIG. 23.

FIG. 30 shows an exemplary spacer and weft knit warp structures resulting from an integrated knitting process in accordance with an embodiment of the present disclosure. FIG. 30 demonstrates that one or more weft knit warp materials may be inserted in one or more layers, layer portions, appendage components, and/or plies asymmetrically 102. Two groups of one or more weft knit warp strands may be used for differing structures. Two or more groups of one or more weft knit warp strands may overlap, forming dynamic structures. Two warp structures may travel in different patterns (e.g., 78 and 79 in a panel in FIG. 25). Spacers, pockets, and/or terry loop cushion structures may take a desired shape in one or more layers, layer portions, appendage components, and/or plies. Each layer, layer portion, appendage component, and/or ply may correspond to one or more other component layouts in the upper assembly. Weft knit warp structures may take a desired trajectory in one or more layers, layer portions, appendage components, and/or plies. Each warp knit weft structure incorporated into a layer, layer portion, appendage component, and/or ply may correspond to one or more other component layouts in the upper assembly. In some embodiments, as shown in FIG. 25, a layer utilizes a warp integration, where strands of specialized material are integrated by the machine, e.g., in a vertical direction. The layer may be aesthetic, covering all or a portion of a polymer reinforcing fiber layer, or it may be utilized as an underlayer, or the warp may add additional materials with desired characteristics to a layer. The warp process may interloop strands in one or more directions, and in one or more knitting techniques as it travels through the fabric structure, for examples: knit, tuck, inlay, float (pass), plait. Additional ligamental-like stretch or reinforcing fibers such as silicon rubber extrusion or an auxetic strand may be configured aesthetically, or anatomically in intarsia zones of the upper, liner, and/or a component, for example to assist in flexing in the toe area while providing ankle roll over prevention, by adding extra stiffness to one or more areas of the upper's sides, as shown in FIG. 24. One or more additional silicon rubber, auxetic, or aramid reinforcing strands may be applied to specific areas of an upper, liner, and/or component to vary the amount of stiffness, flexion, or resilience desired. The positions of the extra strands may also be configured proportionally by size and intended use to map the foot action of the anticipated use such as side to side lateral movements, repeated flexion, quick pivots, starts, and stops. These materials may knit or float, horizontally, diagonally, vertically or in any combination of directions, with all strands continuing in the same direction of each feeder tip.

The feeders in the knitting machine may do this is several ways: 1) intarsia of extra material; 2) adding plaiting of extra material to a specific zone; 3) inlay of one or more additional material strands horizontally, vertically, diagonally or combinations of directions for each strand. In some embodiments, one or more strands may be guided into the upper in the warp direction. The strands may knit, tuck, inlay or float vertically, horizontally, and/or diagonally as the design or function of the upper requires.

The warp strands may act as a reinforcing group, adding additional strength; may be an insulated conductive assembly, ready to be coupled to electronic connectors and components; may be a prementioned heat resistant elasticizing material such as a silicon extrusion, adding a ligamental stretch and recovery effect; or other specific performance materials to add desired characteristics to one or more zones of the three-dimensional fully shaped footwear upper. An example of this is a soccer boot requiring lateral and slide restrictions on the upper material to maintain the ankle from rolling over and the foot from sliding off the sole.

Figure 31:
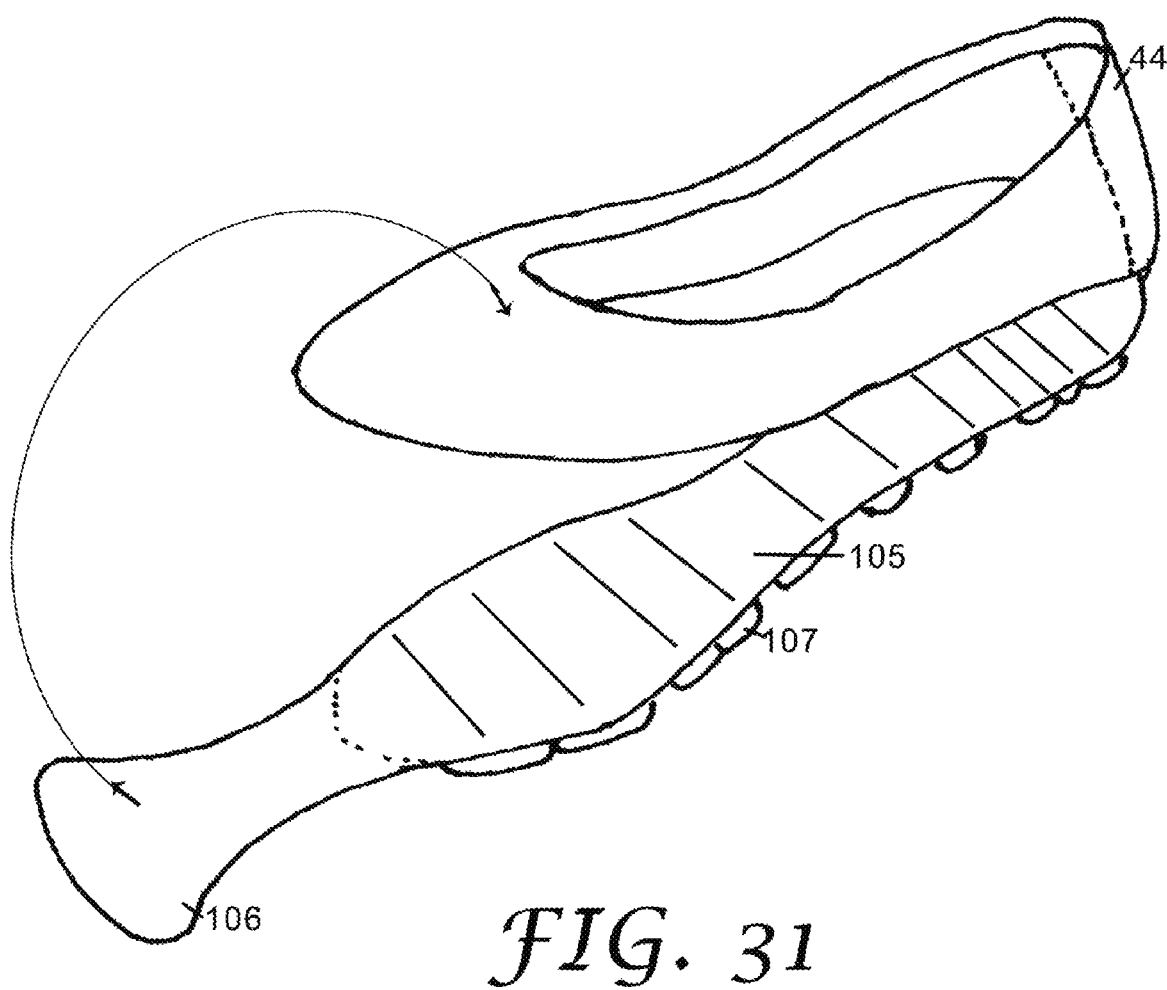
FIG. 31 shows an exemplary seamless shoe upper with a heel insert structure resulting from an integrated knitting process in accordance with an embodiment of the present disclosure.

FIG. 31 shows an exemplary seamless shoe upper with a heel insert structure 44 resulting from an integrated knitting process in accordance with an embodiment of the present disclosure. Attached to the heel is sole appendage attachment 105 with further toe wrap appendage 106. The sole structure has raised dimensional structures 107 arranged proportionally for contact with a floor surface. These raised dimensional structures may be formed in various ways, including spacer, welt, terry loop, jersey tabs the naturally curl on themselves, tubular structure the dimension of the sole structure with internal tacks to the base of the sole material, or any combination of structures. Each layer, layer portion, appendage component, and/or ply may have various configurations of aesthetic and functional materials and structures.

Warp knit weft strands may be inserted into a fabric by an unspooling device. These unspooled materials may include but are not limited to one strand and/or any combination of strands of conductive wires, silicon, fiber optics, carbon fiber, aramids, para-aramids, braid, chain, wire, thermocoupling wire, adhesives, thermo plastic materials, or other fiber reinforcing materials to become one or more parts of one or more layers, layer portions, appendage components, and/or plies of a upper assembly.

Figure 7:
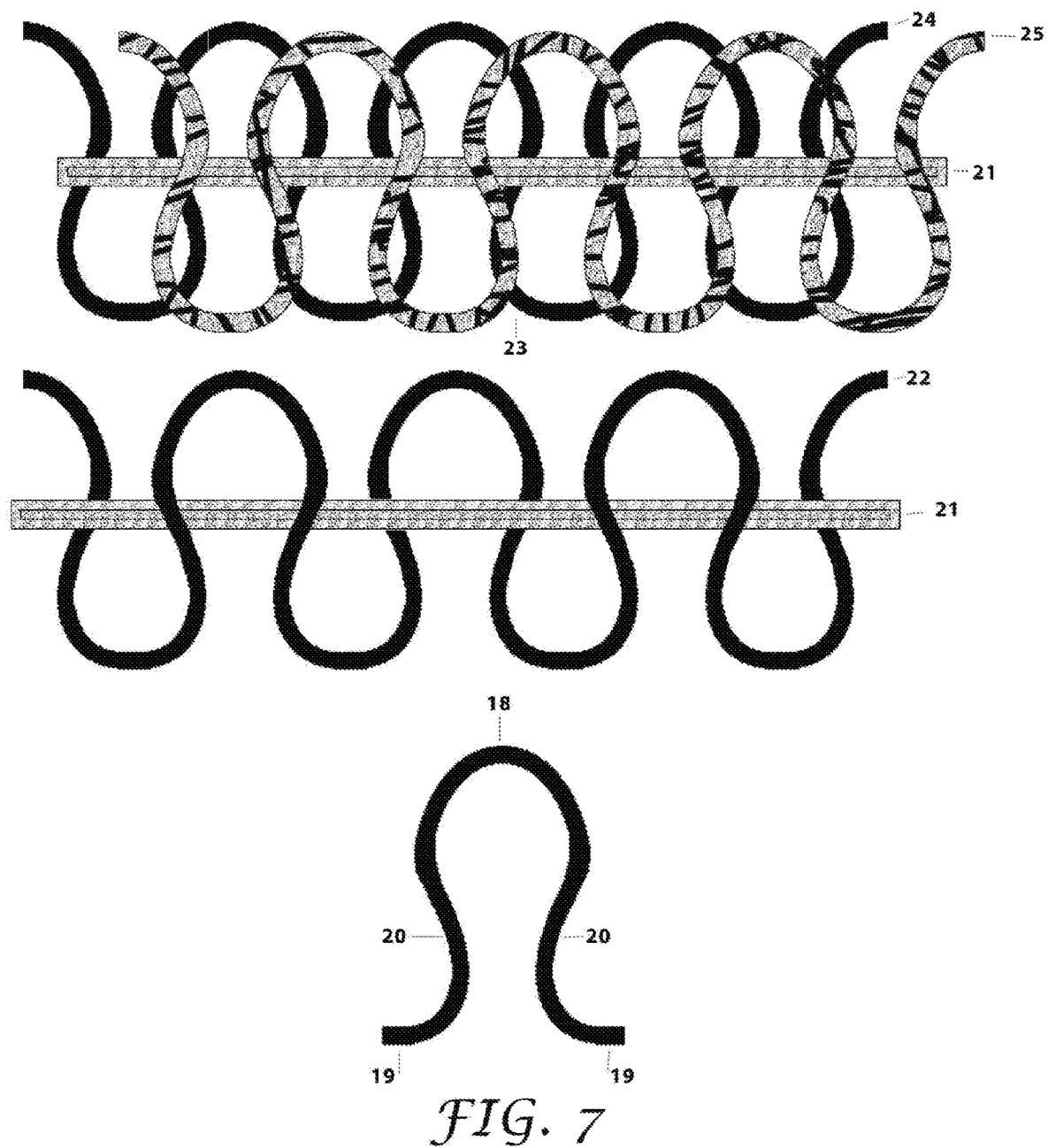
FIG. 7 shows parts of a knitting loop.
Figure 8:
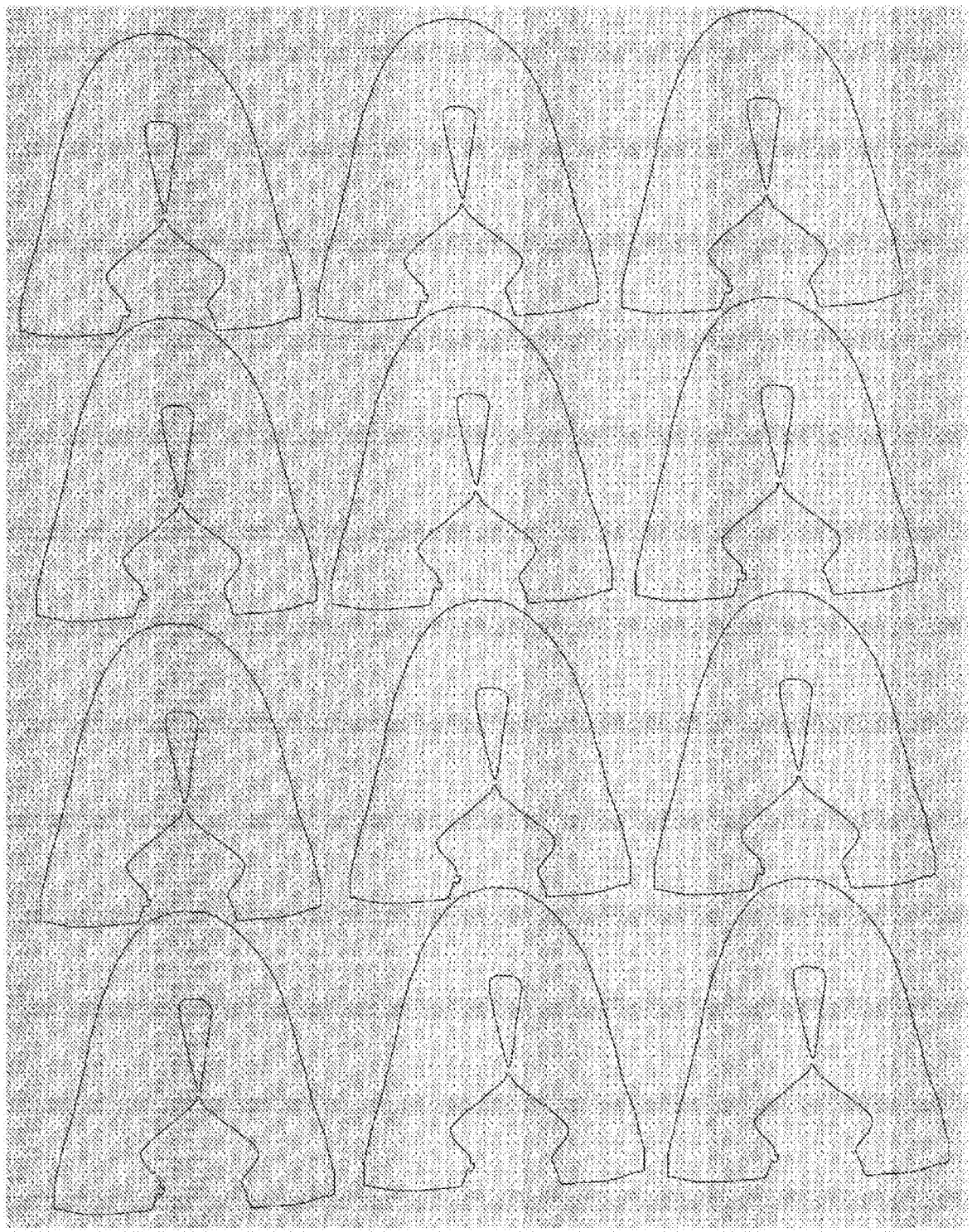
FIG. 8 shows cut and sew roll goods for making shoe uppers.
Figure 9:
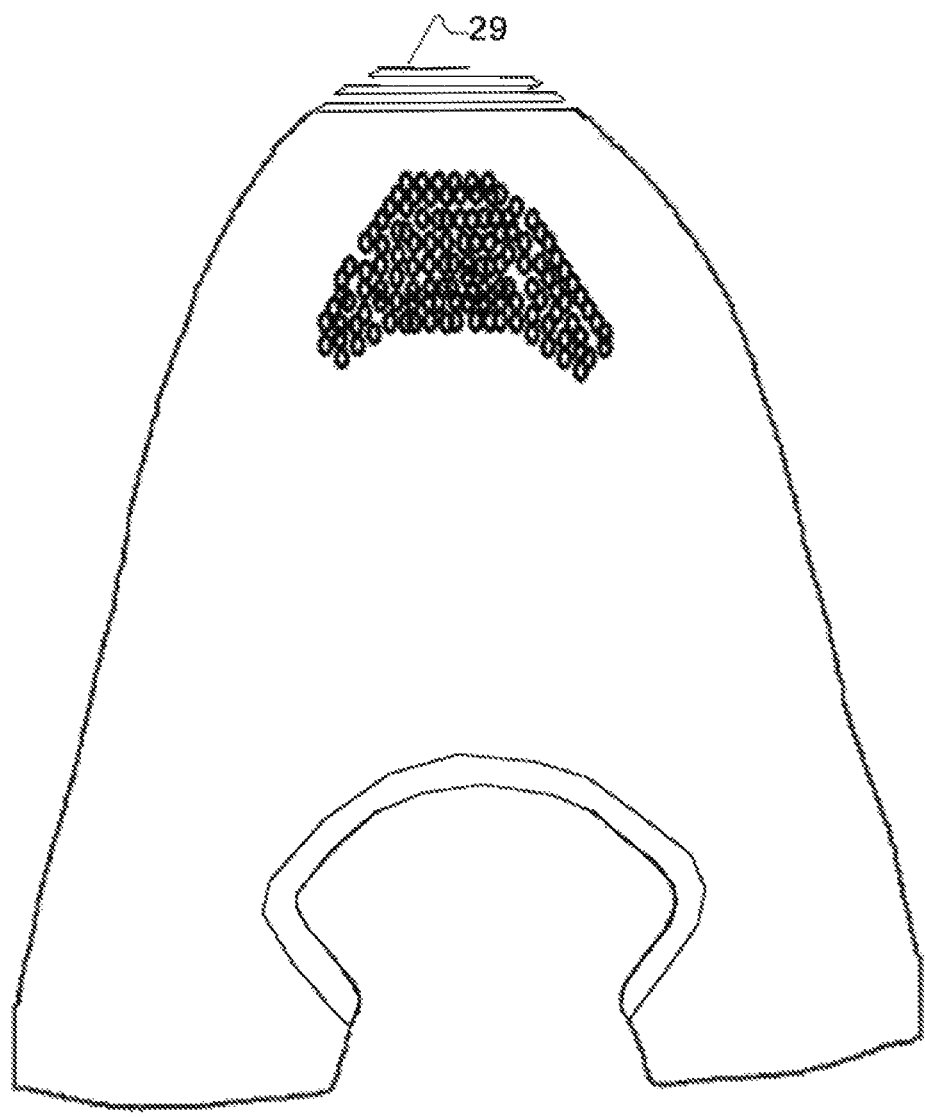
FIG. 9 shows the semi-finished textile upper made in a fully fashioned method.
Figure 10:
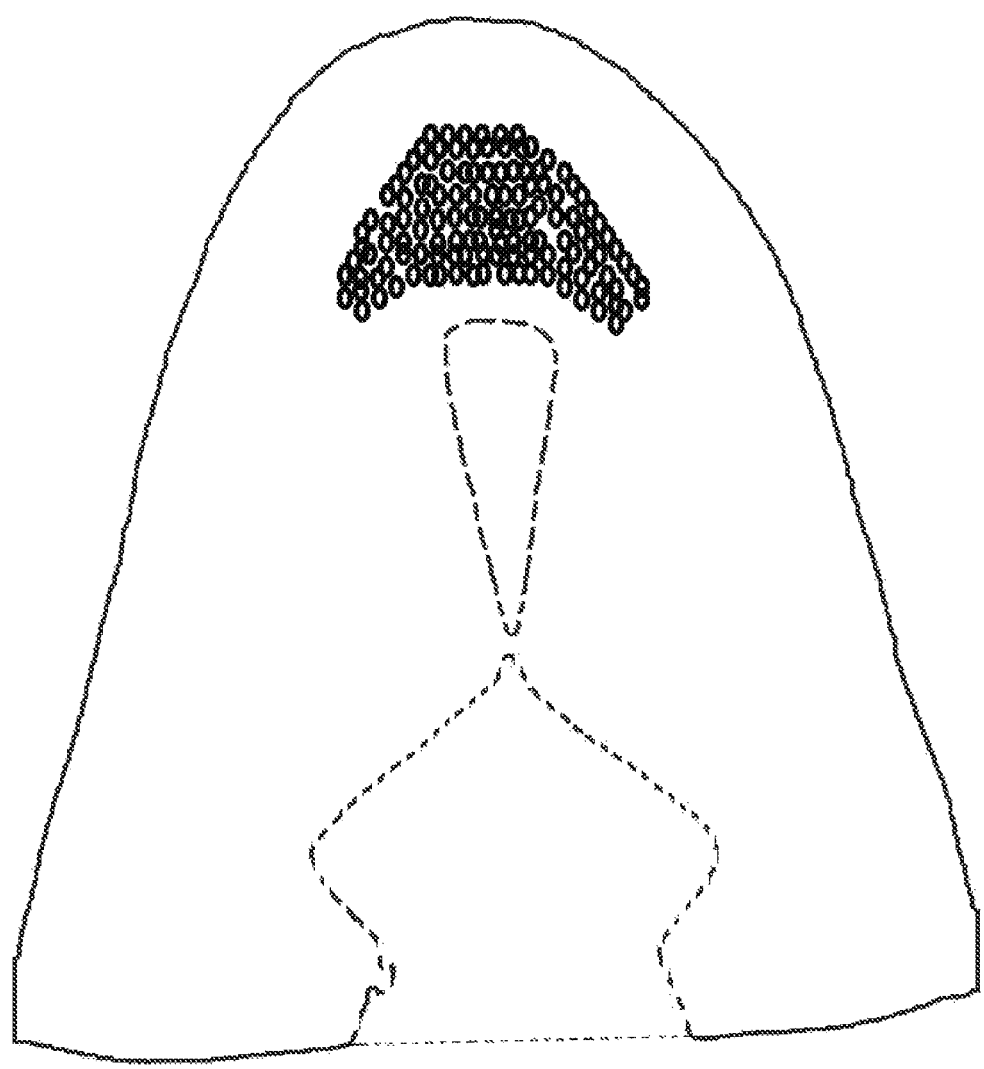
FIG. 10 shows a U-shaped die cut shoe upper made in a hybrid manufacturing method.
Figure 11:
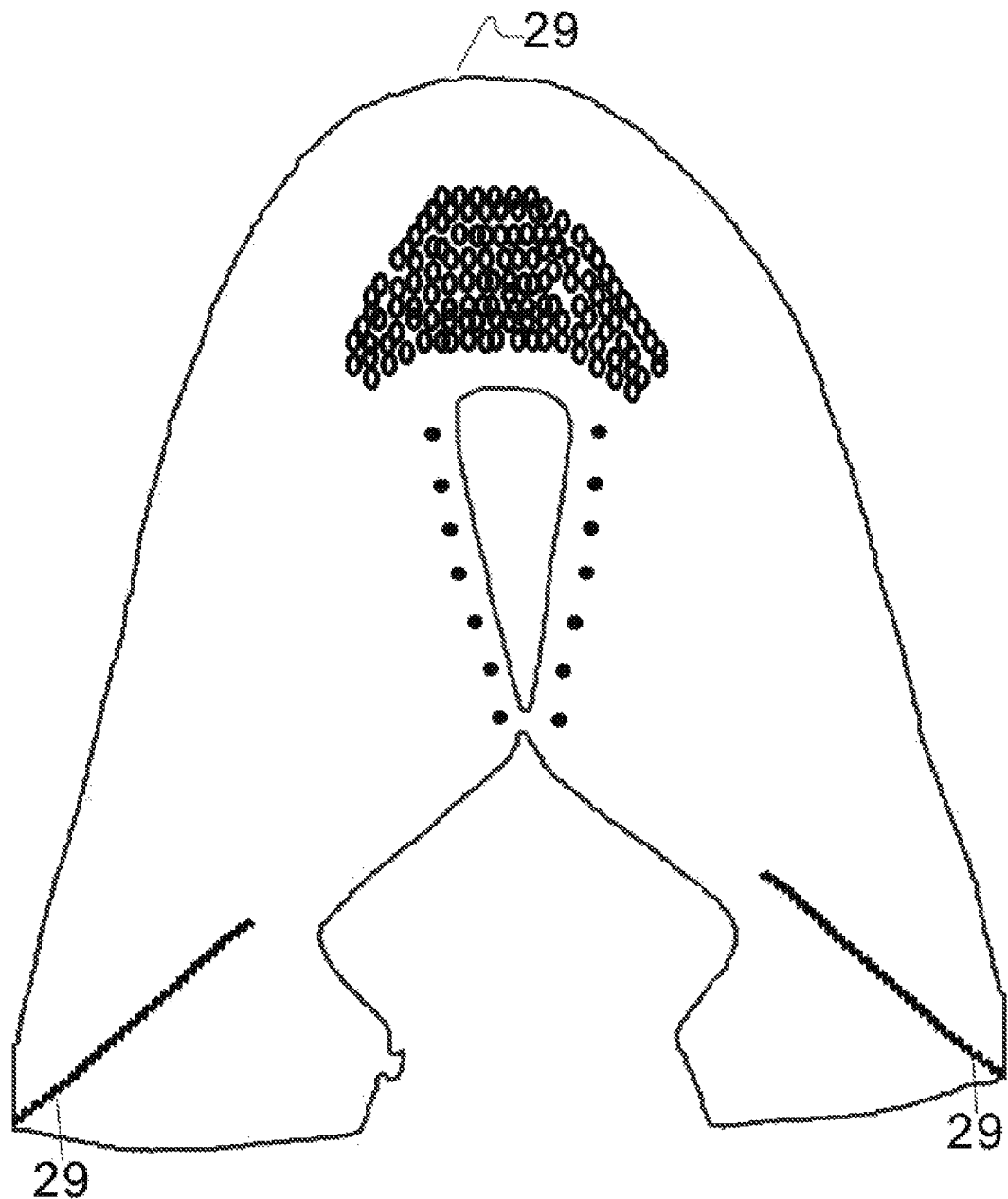
FIG. 11 shows a short row butterfly upper-semi-finished textile upper.
Figure 12:
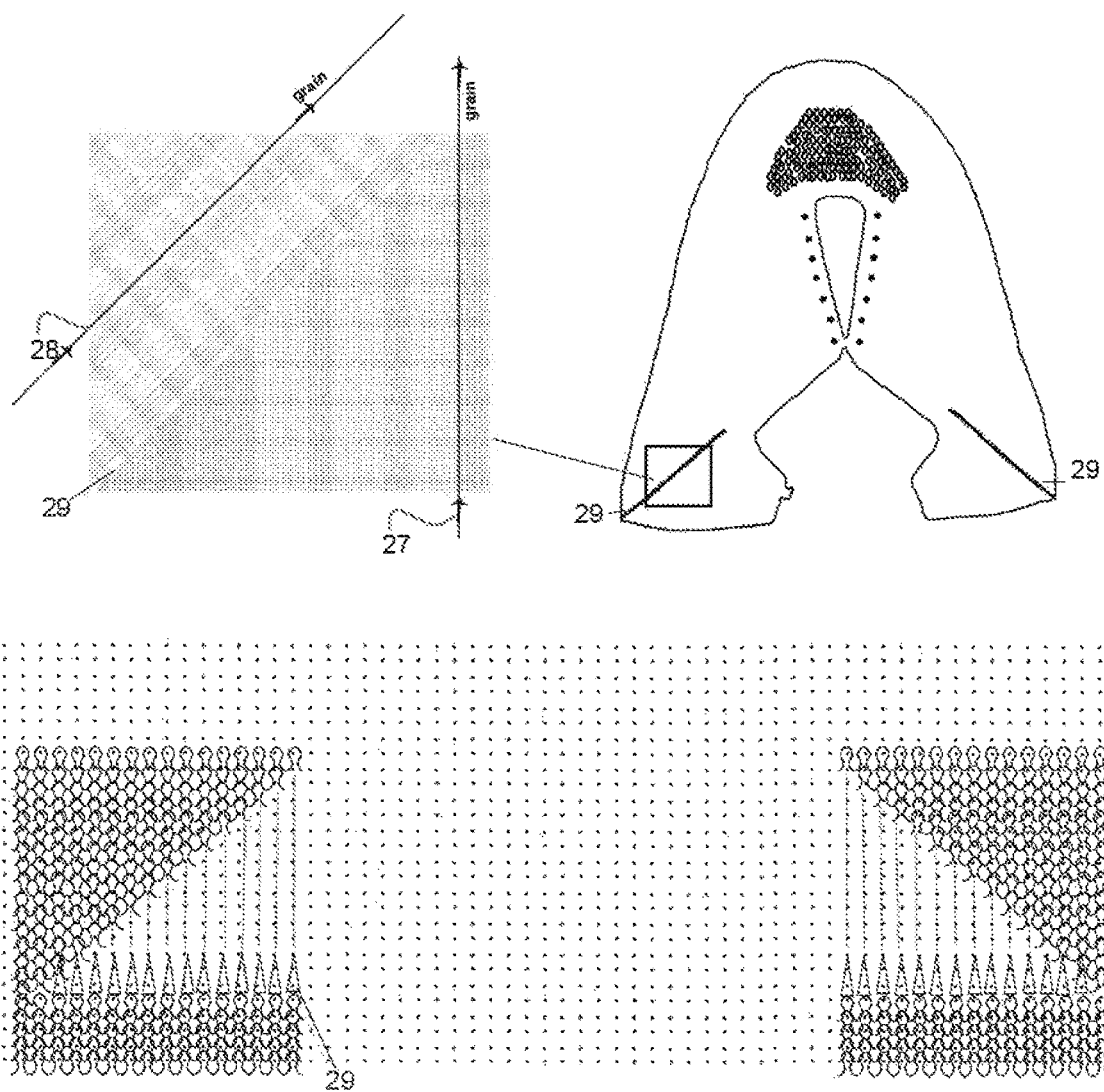
FIG. 12 demonstrates a loop diagram of short rowing, which is adding or decreasing needles by knitting closed darts that resemble wedges in the finished fabric.
Figure 13:
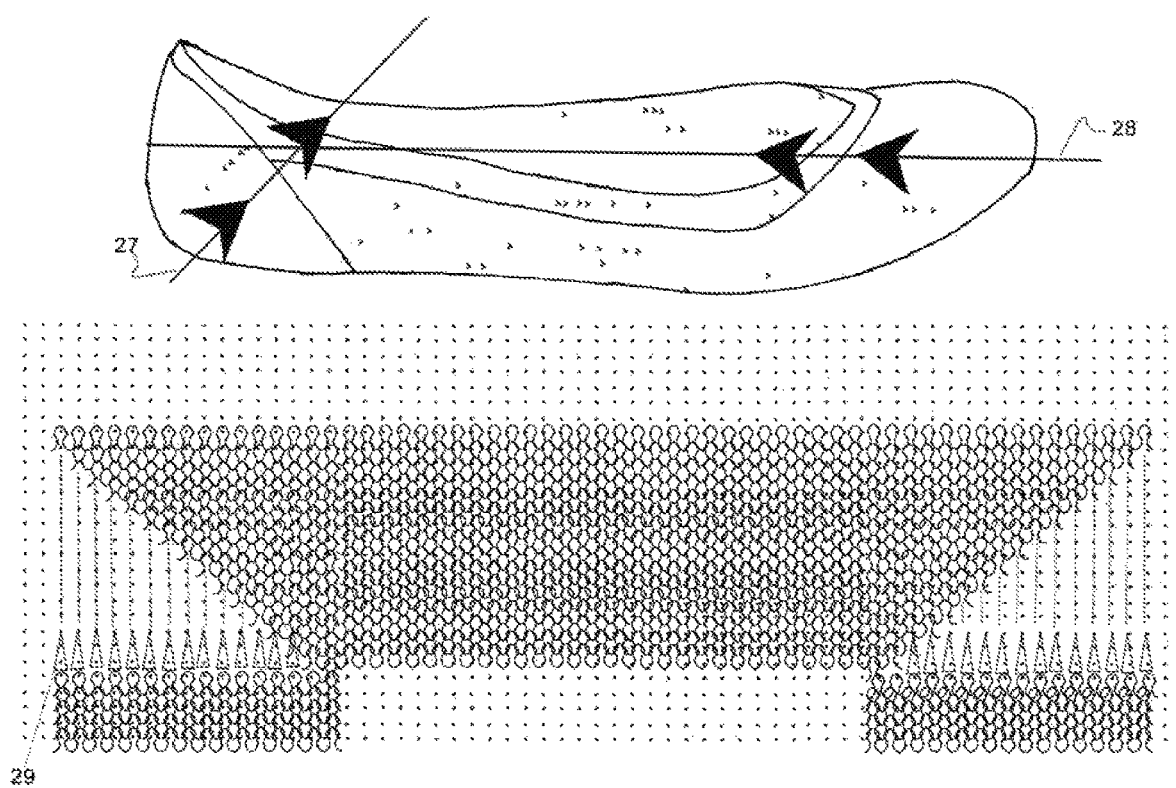
FIG. 13 shows seamless whole garment short row.
Figure 14:
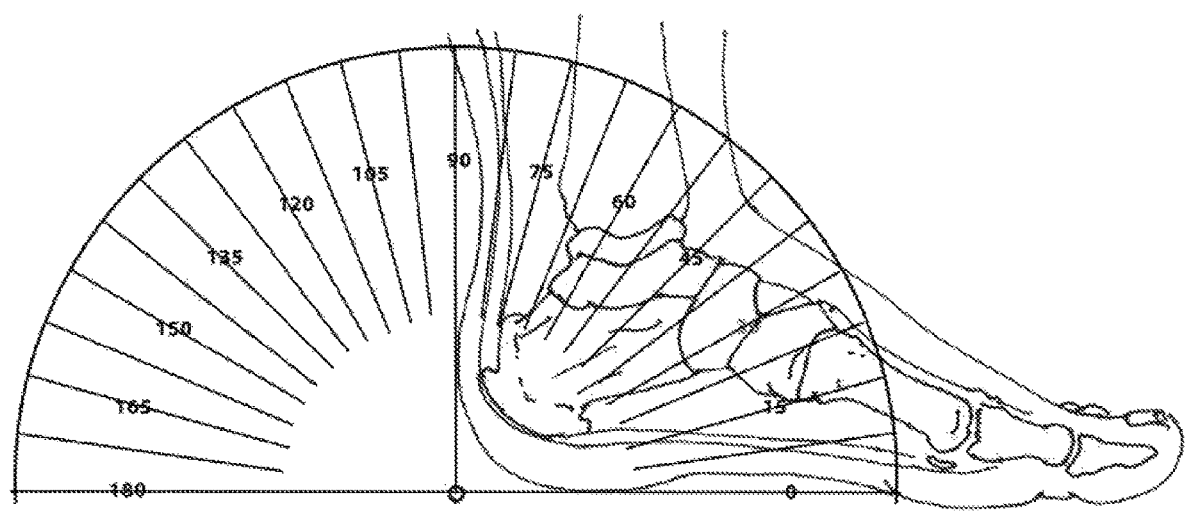
FIG. 14 illustrates the anatomy of a human foot.
Figure 15:
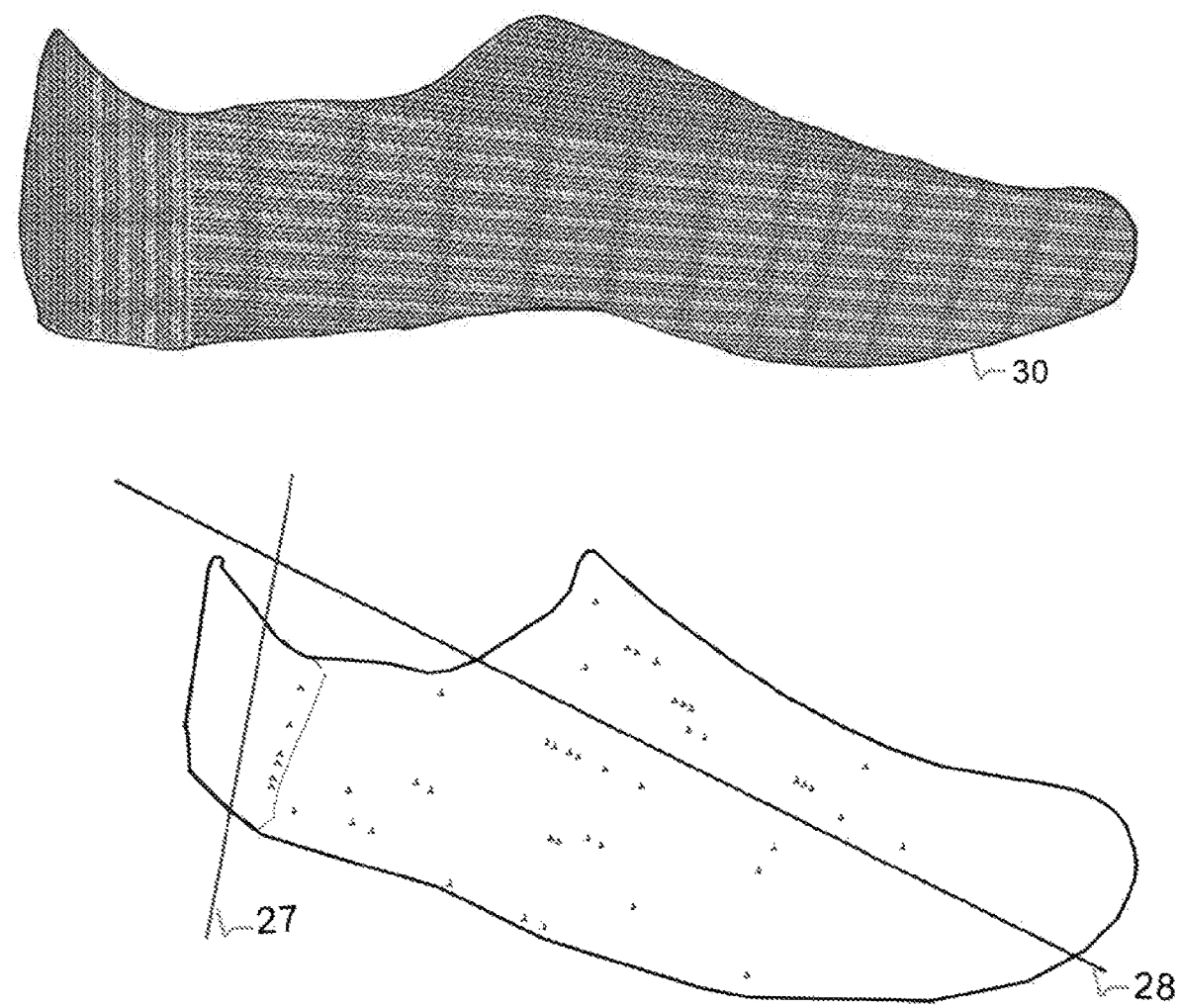
FIG. 15 illustrates an exemplary double bed upper with anatomically appropriate heel that is knitted into a seamless unitary construction in accordance with an embodiment of the present disclosure.

In some embodiments, an attached layer, layer portion, appendage component, and/or ply may be used for embedding thermally conductive material, which might be utilized for heating elements. The strand or group of strands of material may be inlaid and/or knitted; if inlaid, it may pass between the legs of loop structures (see FIG. 7), of a knitted structure such as, a jersey 22, double bed 23, spacer, 101; it may pass inside a tunnel, channel, or three-dimensional raised structure; or it may be embedded into a structure with a series of knit loops, tucking loops, missed loops, or transfers. The strand or group of strands of material may be guided horizontally, vertically, or diagonally, or any combination of directions on an X, Y, Z directional plane. The upper assembly construction may be a single layer or a multiple layer configuration.

The construction may also have fully shaped appendage elements and/or liner areas, where the entire construction and/or component is completely fashioned to shape by the machinery, with no cutting of the component layers, layer portions, appendage components, sub layers, and/or plies. There is no need for a separate sub-assembly process or sewing application. The material would be incorporated consistently by the machine, and the integration repeated automatically in production by the machine's pre-programmed system.

In some embodiments, one or more attached layers, layer portions, appendage components, and/or plies may be used for embedding data transmitting cable and/or components, which might be utilized for smart textile and/ore-textile elements. The strand or group of strands of cable material may be inlaid and/or knitted; if inlaid, it may pass between the legs of loop structures of a knitted structure such as, a jersey FIG. 7, double bed 23, spacer 101; it may pass inside a tunnel, channel, or three-dimensional raised structure; or it may be embedded into a structure with a series of knit loops, tucking loops, missed loops, or transfers. The strand or group of strands of cable material may be guided horizontally, vertically, or diagonally, or any combination of directions on an X, Y, Z directional plane grid as a weft knit warp structure. The knitted construction may have a seamless single layer or a multiple layer assembly configuration. The construction may also have fully shaped appendage elements and/or liner areas receiving any unspooled materials, where the entire construction and/or component is a seamless shape by the machinery, with no cutting, no sewing, and no trimming of the component or component layers. There may be an adhesive, TPU, or thermo plastic material knitted and/or plaited onto on the face and/or reverse sides of adjacent layers, layer portions, appendage components, and/or plies When heat and/or steam is applied, the embedding data transmitting cable and/or component is fixed in place. There is no need for a separate sub-assembly process or sewing application. Both the embedded data transmitting cable and/or component and the adhesive material would be incorporated consistently, and the integration repeated automatically in production by control of a software program.

In some embodiments, one or more layers, layer portions, appendage components, and/or plies may be used for embedding energy transmitting wire, which might be utilized for smart textile wiring connected to devices such as sensors and/ore-textile elements requiring connectors. The strand or group of strands of energy transmitting material may be inlaid and/or knitted; if inlaid, may pass between the legs of loop structures of a knitted structure such as, a jersey FIG. 7, double bed 23, spacer 101; it may pass inside a tunnel, channel, or three-dimensional raised structure; or it may be embedded into a structure with a series of knit loops, tucking loops, missed loops, or transfers. The cable material may be guided horizontally, vertically, or diagonally, or any combination of directions on an X, Y, Z directional plane grid as a a weft knit warp structure. The knitted construction may have a seamless single layer or a multiple layer assembly configuration. The construction may also have one or more fully shaped layer, layer portion, appendage component, and/or ply elements and/or liner areas receiving the unspooled materials, where the entire construction assembly is completely fashioned to shape by the machinery, with no cutting of the component or component layers, layer portions, appendage components, and/or plies. There may be an adhesive, TPU, or thermoplastic material knitted and/or plaited onto on the face and/or reverse sides of adjacent layers, layer portions, appendage components, and/or plies. When heat and/or steam is applied, the energy transmitting cable and/or component is fixed in place.

There is no need for a separate sub-assembly process or sewing application. Both the embedding data transmitting cable and/or component and the adhesive, TPU and/or thermoplastic material would be incorporated consistently, and the integration repeated automatically in production by the machine's pre-programmed system.

In some embodiments, one or more knitted layers, layer portions, appendage components, and/or plies may be used for integration of shape changing and/or stretch memory and/or shape memory wire, such as NiTinol (nickel titanium alloy) or other performance alloys, which might be utilized for transformation textile applications. The strand or group of strands of shape changing material may be inlaid and/or knitted, if inlaid, may be passed between the legs of loop structures of a knitted structure such as, a jersey FIG. 7, double bed 23, spacer 101; may be passed inside a tunnel, channel, or three-dimensional raised structure; or embedded into a structure with a series of knit loops, tucking loops, missed loops, or transfers. The strand or group of strands of cable material may be guided horizontally, vertically, or diagonally, or any combination of directions on an X, Y, Z directional plane grid as a weft knit warp structure. The knitted construction may have a seamless single layer or a multiple layer assembly configuration. The construction may also have fully shaped layer, layer portion, appendage component, and/or ply elements and/or liner areas receiving the shape changing materials, where the entire construction and/or component is completely fashioned to shape by the machinery, with no cutting of the component or component layers, layer portions, appendage components, and/or plies. There may be an adhesive, TPU, and/or thermo plastic material knitted and/or plaited onto on the face and/or reverse sides of adjacent layers, layer portions, appendage components, and/or plies. When heat and/or steam is applied the shape memory material is fixed in place.

There is no need for a separate sub-assembly process or sewing application. Both the shape memory material and the adhesive material would be incorporated consistently, and the integration repeated automatically in production by the machine's pre-programmed system.

In some embodiments, one or more knitted layers, layer portions, appendage components, and/or plies may be used for creating stretch ligaments in knitted textile applications, utilizing materials such as silicon, Dupont's Hytrel, Elastane, Dupont's Lycra, natural or synthetic rubber, stretch olefin, auxetic materials or other materials with stretch and recovery properties to create compression zones and/or impact easing zones. The strand or group of strands of material may be inlaid and/or knitted, if inlaid, it may be passed between the legs of loop structures of a knitted structure such as, a jersey FIG. 7, double bed 23, spacer 101; it may be passed inside a tunnel, channel, or three-dimensional raised structure; or embedded into a structure with a series of knit loops, tucking loops, missed loops, or transfers. The strand or group of strands of cable material may be guided horizontally, vertically, or diagonally, or any combination of directions on an X, Y, Z directional plane grid as a weft knit warp structure. The knitted construction may have a seamless single layer or a multiple layer assembly configuration. The construction may also have fully shaped layer, layer portion, appendage component, and/or ply elements and/or liner areas receiving the stretch and recovery ligament material, where the entire construction assembly and/or one or more components are completely fashioned to shape by the machinery, with no cutting of the component or component layers. There may be an adhesive, TPU, and/or thermo plastic material knitted and/or plaited onto on the face and/or reverse sides of adjacent layers, layer portions, appendage components, and/or plies. When heat and/or steam is applied the stretch and recovery material layer, layer portion, appendage component, and/or ply is fixed in place as part of a complete upper assembly ready to be assembled to a sole in the shoe making process.

There is no need for a separate sub-assembly process or sewing application. Both the embedding data transmitting cable and/or component and the adhesive material would be incorporated consistently, and the integration repeated automatically in production by the machine's pre-programmed system.

In some embodiments, one or more knitted layers, layer portions, appendage components, and/or plies may be used for creating high tenacity restrictor ligaments in knitted textile applications, utilizing materials such as Dyneema, Kevlar, ultra-high molecular polyurethane (UHMWPE), fiber glass, carbon fiber, hemp, linen, flax, resin pre-impregnated materials, monofilaments, multi-filaments or other materials which limit stretch and/or provide reinforcing properties (FIG. 24). The strand or group of strands or material may be inlaid and/or knitted, if inlaid, passed between the legs of loop structures of a knitted structure such as, a jersey (FIG. 7), double bed (FIG. 23), spacer 101; may be passed inside a tunnel, channel, or three-dimensional raised structure; or embedded into a structure with a series of knit loops, tucking loops, missed loops, or transfers. The strand or group of strands of cable material may be guided horizontally, vertically, or diagonally, or any combination of directions on an X, Y, Z directional plane grid as a weft knit warp structure. The knitted construction may have a seamless single layer or a multiple layer assembly configuration. The construction may also have fully shaped layer, layer portion, appendage component, and/or ply elements and/or liner areas receiving the restrictive ligament material, where the entire construction assembly and/or one or more components are completely fashioned to shape by the machinery, with no cutting of the component or component layers, layer portions, appendage components, and/or plies. This component also includes forming a tongue and/or a portion of a tongue in one or more layers, layer portions, appendage components, and/or plies and any remaining portions of a tongue in at least one other layer, layer portion, appendage component, and/or ply (FIG. 22). There may be an adhesive, TPU, and/or thermo plastic material knitted and/or plaited onto on the face and/or reverse sides of adjacent layers, layer portions, appendage component, and/or plies. When heat and/or steam is applied the restrictive ligament material layer is fixed in place as part of a complete upper ready to be assembled to a sole in the shoe making process.

There is no need for a separate sub-assembly process or sewing application. Both the embedding data transmitting cable and/or component and the adhesive material would be incorporated consistently, and the integration repeated automatically in production by the machine's pre-programmed system.

In some embodiments, one or more knitted layers or layer portion components may be used for creating one or more structures, such as a "cage" "lattice" fabric component as one or more layers, layer portions, appendage components, and/or plies in an upper assembly; each "cage" and/or "lattices" structure having one or more apertures or voids 79 plied on top of one or more base layer structures, FIG. 25. Each aperture and/or void 79 having finished sides, edges and branches, framing the aperture and/or void structure. The entire upper assembly responds as a unit.

In some embodiments, one or more knitted layers, layer portions, appendage components, and/or plies may be differing in structure and/or configuration, and/or gauge 31. The entire upper unit may be made of two or more layers having differing geometry, and/or function, and/or aesthetic elements, and/or stitch density FIG. 23.

In some embodiments, one or more knitted layers, layer portions, appendage components, and/or plies may be used for creating a barrier, such as a water resistant and/or waterproof liner plied on top or beneath of one or more base layer structures, FIG. 24. Heat is applied to the thermoplastic polymer, such as a PPS polymer. When heat is applied the polymer becomes semi-fluid and still resembles a knitted structure, although the pores in the knit have closed, and the material remains flexible. The entire layer, layer portion, appendage component, and/or ply responds as a unit, providing a degree of water resistance and/or water proofing, depending on the shoe assembly method and the other footwear component.

In some embodiments, one or more knitted layers, layer portions, appendage components, and/or plies may have one or more similar and/or corresponding structures situated in matching areas on one or multiple layers, layer portions, appendage components, and/or plies. For instance, ventilation areas. The holes for the ventilation may be implemented in the same areas on one or more layers. The entire upper unit functions with ventilation geometry (FIG. 27).

In some embodiments, one or more knitted layers, layer portion, appendage component, and/or plies may be embedded with one or more elements of weft knit warp textile structures as a single strand and/or a group strand application, utilizing one or more types of materials including the aforementioned, restrictive ligaments, stretch and recovery ligaments, NiTinol, metal wire elements, conductive materials, energy transmitting materials, fiber optic materials and materials with other properties. The material may be inlaid, floated and/or knitted; the strand or group of strands may be incorporated into one or more structures such as: tunnel, channel, or three-dimensional raised structure; the strand/or group of strands may form one or more embedded structures with a series of knit loops, tucking loops, missed loops, or transfers. The weft knit warp material may be guided horizontally, vertically, or diagonally, or any combination of directions on an X, Y, Z directional plane grid. The knitted construction may have a single layer or a multiple layer, layer portion, appendage component, and/or ply configuration. The construction may also have one or more fully shaped layers, layer portions, appendage components, and/ or plied elements and/or liner areas receiving the weft knit warp material, where the entire construction and/or upper assembly is completely fashioned to shape by the machinery, with no cutting of the component or component layers, layer portions, appendage components, and/or plies. There may be an adhesive, TPU, and/or thermo plastic material knitted and/or plaited with the weft knit warp structure onto on the face and/or reverse sides of adjacent layers, layer portions, appendage components, and/or plies. There may be a restrictive ligament material knitted and/or inlaid with as a weft knit warp structure onto on the face and/or reverse sides of one or more layers, layer portions, appendage components, and/or plies. When plied gathered, or folded together, the upper assembly is fixed in place as part of a complete upper ready to be assembled to a sole in the shoe making process.

There may be a stretch and recovery ligament material knitted and/or inlaid as a weft knit warp structure onto on the face and/or reverse sides of adjacent layers, layer portions, appendage components, and/or plies, forming compression and/or amplified stretch zones. When plied, gathered, and/or folded together, the upper assembly is fixed in place as part of a complete upper ready to be assembled to a sole in the shoe making process.

There is no need for a separate sub-assembly process or sewing application. Both the stretch and recovery ligament material and any component and the adhesive, TPU, and/or thermo plastic material would be incorporated consistently, and the integration repeated automatically in production by the machine's pre-programmed system.

In some embodiments, the knitting machine, or other automated footwear assembly machine, can be controlled by the controller to produce the daisy-chained strip of fully shaped three-dimensional footwear uppers. The controller can be any conventional processor, computer or other computing device. The controller can be electrically coupled to the machine, and can be in communication with a memory, a data storage module, a network, a server, or other construct that can store and/or transfer data. That program can be any particular type of data related to footwear uppers. For example, the program can include a first fully shaped three-dimensional footwear upper profile pertaining to one or more particular knitting patterns or other patterns associated with and/or incorporated into the fully shaped three-dimensional footwear upper. The profile of the fully shaped three-dimensional footwear upper can be implemented, accessed and/or utilized by the machine, in the form of a code, program and/or other directive. The profile can be executed to generate the fully shaped three-dimensional polymer reinforcing fiber footwear upper with various features such as: the predefined three-dimensional shape; the position, dimension and/or depth of a heel; the position of an apex and curve of the ankle; the length and location of an instep with eyelets; the position and dimension of various edges and calibration marks for sewing to the liner; the position and dimension of a toe box, also referred to as a front toe gather; the position and dimension the cushioning areas and/or lip edge of the ankle; the side to side lateral stiffness of the heel; the minimum width of the fully shaped three-dimensional footwear upper; the side to side curvature of the mid-foot, toe, medial arch, lateral side, and the like.

A knitted to shape three-dimensional footwear upper assembly may be paired with a second knitted to shape three-dimensional footwear upper assembly that is a polymer reinforcing structure, which is stacked upon a third knitted to shape three-dimensional footwear upper liner to create an article of footwear. FIG. 22 is an exemplary knitted ply structure of a three-dimensional footwear upper assembly, which may have an auxetic warp integrated technique; a second knitted to shape three-dimensional footwear upper that is a light weight, dynamically flexible polymer reinforcing structure, which is stacked to create an article of footwear resistant to puncture, for example as a soccer boot, in accordance with an embodiment of the present disclosure.

The controller and/or the automated footwear knitting/assembly machine can access the fully shaped three-dimensional footwear upper assembly shoe design profiles to thereby control the knitting/assembly machine and produce a strip of fully shaped three-dimensional footwear upper components sequentially, in a desired number and configuration needed to create the user's desired footwear design. Each of the fully shaped three-dimensional footwear upper layers, layer portions, appendage components, and or plies can include a substantially identical predefined three-dimensional shape, configuration, and preferred size, and can have virtually identical physical features, such as those enumerated above in connection with the fully shaped three-dimensional footwear upper data. Alternatively, where the machine is configured to produce only a single fully shaped three-dimensional footwear upper component assembly to create the desired shoe design, the machine can be controlled by the controller, which can utilize the first fully shaped three-dimensional footwear upper design profile to produce a fully shaped three-dimensional footwear upper assembly having features that correspond to the design profile.

In turn, a user can configure different fully shaped three-dimensional footwear uppers with various performance element profiles, including sizes, configurations, and/or modular styles, and select the one that best suits their preferences. In addition, if a user has a particular profile preference, that profile can be stored in a database. When the user wears out their first fully shaped three-dimensional footwear upper liner, or component, the user can request an identical footwear upper assembly, liner, liner portion, appendage component, or ply to be produced. Thus, the user can start again with virtually the same fully shaped three-dimensional footwear upper design, liner, liner portion, appendage component, or ply and associated feel as they had with the previous fully shaped three-dimensional footwear upper design. This can enhance the comfort of the user. Also, the user need not go through extensive selection process and time-period to locate a fully shaped three-dimensional footwear upper that performs as desired. Instead, upon purchase of the new fully shaped three-dimensional footwear upper combination, the fully shaped three-dimensional footwear upper assembly design will consistently perform as expected. Due to the durability and life span of materials, a user may wear out an upper cover layer, liner, liner portion, appendage component, ply or a sole and may only need to replace that portion of the article of footwear which is worn. Knitting uppers liners, liner portions, appendage components, or plies individually lends itself to modular footwear designs, where shoe parts such as soles, toe caps, uppers and inserts may be interchanged and replaced for aesthetic or functional efficiency and practicality.

When producing an individual unit or connected strip of: footwear upper assemblies with liners, liner portions, appendage components, or plies, multi-layered uppers, or fully shaped upper assemblies, each uppers assembly unit in strip can be separated from one another in a variety of manners. A waste section can be knitted at the start of each individual unit or connected strip of units, at the end and in between each individual unit and successive unit.

According to embodiments of the present disclosure, the method of manufacturing knitted fully shaped three-dimensional footwear upper assemblies with one or more liner, liner portion, appendage component, or ply elements, the start and the bottom edge interface of the toe element can be only a strand, or a couple strands waste and a decoupling sacrificial strand, which protects the finished bottom edge ("toe"). In manufacturing an individual fully shaped three dimensional upper, the heel area has no edge interface and therefore no waste section.

In manufacturing a daisy-chained strip of fully shaped three-dimensional uppers with one or more liner, liner portion, appendage component, or ply elements, the heel area has an edge interface strand protecting the finished edge of at least one component and that interface strand links up to bottom edge of another component, for example a "toe", interface strands of the next fully shaped three-dimensional footwear upper assembly component, separated by a decoupling (or sacrificial) strand. This transition area can mimic or follow the curvature of a bottom edge ("toe") of a particular component of a fully shaped three-dimensional upper assembly as desired. Therefore, there is no waste section except a few strands waste per unit, which is less than 1% of the total weight of the fully shaped three-dimensional footwear upper assembly.

In one example, the respective edges of a liner, liner portion, appendage component, or ply, for example heel to toe, can be joined with the edge interface strands of another component in the form of a single pull stitch or strand. This pull stitch can be pulled by a machine or a human operator so that the respective edges separate from one another and/or the edge interface, thereby allowing one fully shaped three-dimensional footwear upper assembly to be removed from or dissociated from another fully shaped three-dimensional footwear upper assembly. Likewise, the edge can include one or more pull strands that can be pulled via a machine or human operator to separate the lower edge from the edge interface.

In some cases, where the lower edge of a component, for example a "toe" of one fully shaped three-dimensional footwear upper assembly is joined directly with the upper edge of for example a "heel" of another fully shaped three-dimensional footwear upper assembly, a pull strand at the edge interface can be pulled to separate the second fully shaped three-dimensional footwear upper assembly from the first fully shaped three-dimensional footwear upper assembly.

Another manner of separating the fully shaped three-dimensional footwear upper assemblies from the daisy-chained strip can include the use of a decoupling element. This decoupling element can decouple one fully shaped three-dimensional footwear upper assembly from the next, e.g., at the edge interface or respective edges of the fully shaped three-dimensional footwear upper components. A decoupling device can be used to decouple, which may include shears, pressurized steam or other separating device or mechanism, which cuts, pulls, or melts the thermoplastic separation strands across the lower edge ("toe") of each fully shaped three-dimensional footwear upper assembly. In so doing, those shears cut, the pressurized steam melts or evaporates off, the next adjacent and/or successive fully shaped three-dimensional footwear upper assembly. The decoupling element can make multiple cuts, multiple pulls, or steaming traverses, one adjacent the upper edge ("heel") of each successive fully shaped three-dimensional footwear upper assembly and/or adjacent the lower edge, for example a "toe" of the each successive fully shaped three-dimensional footwear upper assemblies. In cases where the edge interface element is only a strand and/or a couple strands wide, the decoupler can cut or steam melt across this edge interface, thereby separating the respective edges of the third and second fully shaped three-dimensional footwear upper assemblies. From there, the fully shaped three-dimensional footwear upper assemblies can be dropped into a bin or other container for further processing on an individual basis. In some embodiments, a continuous strip of multiple fully shaped three-dimensional footwear upper assemblies with one or more liner, liner portion, appendage component, or ply elements can be rolled on a spool and delivered to a manufacturer who can then mechanically or manually disassociate the individual fully shaped three-dimensional footwear upper assemblies from the daisy-chained strip.

Upon decoupling of the individual fully shaped three-dimensional footwear assemblies, each separated upper assembly generally retain their predefined three-dimensional shapes. For example, even upon decoupling, the individual uppers may retain the concavity of the concave shape and/or contour of the toe, mid-foot, instep, ankle and heel and the heel angle. Retaining its shape also assures that the fully shaped three-dimensional footwear upper fits consistently into other post-processing tools, molds, and sewing equipment that is required for manufacturing the finished article of footwear ("shoe") repeatedly and consistently.

Making the fully shaped three-dimensional upper assemblies in a daisy-chained strip form can also generate a fully shaped three-dimensional footwear upper assembly daisy chained strip having varying widths. For example, the knitting machine can vary the widths of the upper assemblies in a daisy-chained strip by size and/or individual fully shaped three-dimensional footwear upper assemblies of the strip. For example, the machine can mechanically manipulate strands to generate fully shaped three-dimensional footwear upper assemblies along the strip that have a width at their outermost lateral boundaries of a large size shoe, perhaps a men's size twenty-two. The largest size is generally the maximum width of a liner, liner portion, appendage component, or ply in the fully shaped three-dimensional footwear upper assembly unit, and along its length there is no limit. This maximum width of a strip can correspond to the region of the fully shaped three-dimensional footwear upper assembly unit as measured across the instep at the widest part of the toe flexion. It also can be the maximum of width of any individual liner, liner portion, appendage component, or ply of a fully shaped three-dimensional footwear upper assembly or attached span of the widest appendages that is formed along the daisy-chained strip.

The machine also can mechanically manipulate the strands and the overall width of the daisy chained strip so that the fully shaped three-dimensional footwear upper assemblies in the strip includes a second width, which is less than the first width. The second width can correspond generally to the region of the fully shaped three-dimensional footwear upper assembly units near the heel, heel tab and/or any other rearward appendage. By precisely knitting the daisy-chained strip in the respective fully shaped three-dimensional footwear upper assemblies therein, minimal waste is generated from the process. This is true even when the individual fully shaped three-dimensional footwear upper assemblies and the daisy-chained strip width varies. The knitting machine may also knit different sizes of a fully shaped three-dimensional footwear upper assemblies, and any layers, liners, liner portions, appendage components, or plies required of the design, with each component as a unit, without the edge interface strand. The waste material that is usually knitted between the maximum width and the smaller width of different units in a strip with off the shelf machine builder software and CAD in addition to an interface strand would otherwise be removed and discarded as waste. Further, to remove this material would typically require additional machinery and/or human intervention or manipulation.

Textile materials for forming typical shoe uppers may be selected based upon the properties of wear-resistance, flexibility, stretch, and air-permeability, for example. The upper assembly may be formed by a conventional method of cutting and sewing, therefore cut from numerous material elements, which each may impart different properties to specific portions of the upper. This cutting and sewing method creates considerable waste.

In some embodiments, selection of a yarn takes into consideration the size of the shoes. For example, for the same shoe configuration (the same style or model) and the same specific zone (e.g., the toe portion) of the shoe, the reinforcement yarn used to make a size 6 shoe can be different from that used on a size 12. For example, the reinforcement yarns have different strength or other specification, or can be knitted in a different manner or different layout (different area proportions), for the different sizes. A monofilament or an adhesive yarn may be used mathematically and proportionally different for size 6 than for size 12, e.g., different in strength, thickness, or layout.

Two-dimensionally shaped knitted textiles and/or three dimensionally knitted textiles, which are semi-finished textiles used in footwear uppers are generally seamed at the heel, the medial arch or other parts of the foot, generally provide lightweight, air-permeable structures that are flexible and comfortably receive the foot and have heightened movement and flexibility. Use of roll good fabrics, die cut, hand cut, two-dimensionally shaped knitted textiles and/or three dimensionally knitted textiles which are semi-finished in footwear uppers typically require seams. Seams introduce difficulties and limitations, to include difficulties in manufacture and freedom of design, and unintended abrasion to the user causing, for example, blisters and thereby compromising athletic performance.

According to embodiments of the present disclosure, layer, liner, liner portion, appendage component, or ply structure in the shape of a footwear upper, liner, or component can be formed entirely in one piece has no seam weakness or failure points and causes no seam irritation or pressure points.

To impart other properties to any layer, liner, liner portion, appendage component, or ply of the fully finished three-dimensionally knitted footwear assembly structure, including durability, flex/recovery, comfort, and stretch-resistance, additional materials can be typically combined or integrated in the knitting process, including but not limited to reflective, cut resistant, flame-retardancy, shock resistant, thermoplastic, insulative, adhesive, reinforcing, ventilating, cushioning, reflective, aesthetic, for example. Three-dimensionally knitting an upper assembly to shape allows integrating specific materials into areas, the ability to transition or blend the reinforcement, stretch or other specific performance features, into regions to: reinforce against abrasion or other forms of wear; provide seamless flex; create areas of stretch resistance/limitation or other performance features; better secure the upper assembly to the sole; minimize waste of materials. Combining features of a reinforcing structure layer or element and a three-dimensionally knitted performance layer in an article of footwear, creates a multifunctional shoe structure.

During the knitting process, as shown in FIG. 21, a series of strands may be fed into the machine by automatically pulling a plurality of strands or other materials off a plurality of spools/packages 66 with the movement of the knitting machine feeders 10. Specialized materials such as fiber-reinforced polymer strands, auxetic strands, stainless steel, silicon, chain, metals, heated hose, catheter heater wire, sensing wire, cable, braid, extrusion, and other materials that must be packaged on a spool 65, and 'unwound' off that package not to cause torque are fed into the machine by any automatic unspooling device 66. An upper assembly, one or more layer, liners, liner portion, appendage component, or plies may be combined to create a complete article of footwear.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

What is claimed is:

1. A method of manufacturing footwear articles, the method comprising:
    performing a knitting process to generate a first footwear upper that comprises a plurality of knitted members, wherein the plurality of knitted members comprises: a footwear upper layer and a footwear upper appendage;
    wherein the knitting process comprises:
    knitting the plurality of knitted members sequentially by using multiple strand materials, wherein each of the plurality of knitted members is knitted with finished edges;

generating textile connection structures to attach each of the plurality of knitted members with an adjacent knitted member of the plurality of knitted members;

repositioning the plurality of knitted members relative to each other into a first unitary textile construction that defines a footwear upper assembly, and the first unitary textile construction comprises: a lateral side portion; a toe portion; a medial side portion; an ankle portion; an instep portion; and a heel portion; and attaching the footwear upper assembly with an outsole.

2. The method of claim 1, wherein the performing of the knitting process to generate the plurality of knitted members further comprises knitting a footwear underlayer.

3. The method of claim 2, further comprising knitting one or both of the footwear upper layer and the footwear underlayer in the form of a tube and/or sock structure.

4. The method of claim 1, further comprising knitting at least one of the plurality of knitted members in the form of a tube and/or sock structure.

5. The method of claim 4, further comprising incorporating a pocket or channel into one or more areas of the tube and/or sock structure.

6. The method of claim 4, further comprising incorporating one or more ventilation holes into one or more areas of the tube and/or sock structure.

7. The method of claim 1, further comprising:
utilizing a weft knit warp feed system to integrate one or more strands horizontally, vertically, and diagonally into at least two of the plurality of knitted members by knitting, inlaying, floating, and tucking the one or more strands.

8. The method of claim 1, wherein the knitting of the plurality of knitted members further comprises:
incorporating a first material on an interior layer of a void designed for holding a foot of the footwear upper assembly; and
incorporating a second material on an exterior layer of the footwear upper assembly, the second material differing from the first material.

9. The method of claim 8, wherein the knitting of the plurality of knitted members further comprises knitting an internal layer that is configured to be disposed between the interior layer and the exterior layer, the internal layer comprising a third material, the third material differing from the first material and the second material.

10. The method of claim 8, further comprising:
manipulating at least one of the plurality of knitted members into a predefined place by a knitting machine; and
attaching, by the knitting machine, existing loops of the at least one of the knitted members to existing loops of another one of the plurality of knitted members.

11. The method of claim 8, wherein the knitting of the plurality of knitted members further comprises knitting an internal layer that is configured to be disposed between the interior layer and the exterior layer using a third material, the third material differing from the first material and the second material; and
incorporating the third material into both the interior layer and the exterior layer.

12. The method of claim 1, wherein the knitting of the plurality of knitted members knitting a portion of a first layer of a multi-layer construction into a positive pattern;
knitting a portion of a second layer of the multi-layer construction into a negative pattern;
dove tailing the first layer with the second layer such that the positive pattern interacts with the negative pattern; and
bonding the portion of the first layer with the portion of the second layer.

13. The method of claim 8, further comprising knitting a cage or lattice structure into at least one of the plurality of knitted members.

14. The method of claim 1, wherein the knitting of the first footwear upper in the knitting process may be controlled by a first set of computer instructions for execution by a knitting machine and the method further comprises:
executing the first set of computer instructions for the knitting of the first footwear upper.

15. The method of claim 14, wherein the executing of the first set of computer instructions for the knitting of the first footwear upper results in the knitting of a pocket structure in at least one knitted member of the plurality of knitted members;
inserting a component into the pocket structure; and
using the knitting machine, sealing the component into the pocket structure.

16. The method of claim 14, wherein the knitting of the first footwear upper in the knitting process may be controlled by the first set of computer instructions for execution by the knitting machine and the method further comprises:
combining user preference data associated with desired modifications to the first footwear upper with the first set of computer instructions and generating a combined set of computer instructions that includes the user preference data for execution by the knitting machine; and
executing the combined set of computer instructions for the knitting of the first footwear upper with the desired modifications to the first footwear upper.

17. The method of claim 16, wherein the knitting of the first footwear upper with the desired modifications comprises varying a performance element profile, size, configuration and/modular style of the first footwear upper as compared with the executing of the first set of computer instructions for the knitting.

18. The method of claim 1, wherein the knitting of the plurality of knitted members further comprises using a water resistant and/or waterproof material in at least one of the plurality of knitted members; and
heating the water resistant and/or waterproof material to close pores located within a knitted structure.

19. The method of claim 18, further comprising incorporating the at least one of the plurality of knitted members comprising the water resistant and/or waterproof material between other layers of a multi-layer configuration for the footwear upper assembly.

20. The method of claim 19, further comprising implementing ventilation holes in one or more layers of the multi-layer configuration for the footwear upper assembly.

* * * * *